(12) United States Patent
Batra et al.

(10) Patent No.: US 11,375,578 B2
(45) Date of Patent: Jun. 28, 2022

(54) BLUETOOTH CONNECTIONLESS SLAVE BROADCAST BURST MODE

(71) Applicant: QUALCOMM Incorporated, San Diego, CA (US)

(72) Inventors: Mayank Batra, Cambridge (GB); Joel Linsky, San Diego, CA (US); Robin Heydon, Cambridge (GB); Brian Redding, Urbana, IL (US); Laurence George Richardson, Ely (GB)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/250,837

(22) Filed: Jan. 17, 2019

(65) Prior Publication Data
US 2020/0092945 A1 Mar. 19, 2020

Related U.S. Application Data

(60) Provisional application No. 62/732,554, filed on Sep. 17, 2018.

(51) Int. Cl.
*H04W 84/20* (2009.01)
*H04H 60/13* (2008.01)
(Continued)

(52) U.S. Cl.
CPC .......... *H04W 84/20* (2013.01); *H04B 1/7136* (2013.01); *H04H 60/13* (2013.01); *H04W 4/06* (2013.01); *H04W 72/0446* (2013.01)

(58) Field of Classification Search
CPC ... H04W 84/20; H04W 72/0446; H04W 4/06; H04B 1/7136; H04H 60/13
See application file for complete search history.

(56) References Cited

U.S. PATENT DOCUMENTS 6,975,684 B1 * 12/2005 Dabak ................ H04B 1/715
375/295
2003/0035389 A1 2/2003 Chen et al.
(Continued)

FOREIGN PATENT DOCUMENTS

JP H10285108 A * 10/1998

OTHER PUBLICATIONS

Bluetooth Core Specification v 5.0—Bluetooth SIG Proprietary Publication Date: Dec. 6, 2016 (Year: 2016).*
(Continued)

*Primary Examiner* — Edan Orgad
*Assistant Examiner* — Malick A Sohrab
(74) *Attorney, Agent, or Firm* — Procopio, Cory, Hargreaves & Savitch LLP

(57) ABSTRACT

The present disclosure provides a mechanism to perform a CSB burst mode between a master device and one or more slave devices. In CSB burst mode, the master device may broadcast more than one packet of data in a CSB interval, and hence, may use the time slots in a CSB interval more efficiently than while operating in traditional CSB mode. CSB burst mode of the present disclosure may be used to improve the latency and duty cycle of data transmissions, such as for example, broadcast audio. In an aspect of the disclosure, a method, a computer-readable medium, and an apparatus are provided. The apparatus may determine to broadcast a set of packets during a CSB interval, where the set of packets includes a plurality of packets. In some
(Continued)

aspects, the apparatus may broadcast the set of packets during the CSB interval to a set of second nodes.

44 Claims, 11 Drawing Sheets

(51) Int. Cl.
*H04W 72/04* (2009.01)
*H04W 4/06* (2009.01)
*H04B 1/7136* (2011.01)

(56) References Cited

U.S. PATENT DOCUMENTS

| | | | | |
|---|---|---|---|---|
| 2003/0106008 A1* | 6/2003 | Butler | H03M 13/6502 | 714/752 |
| 2004/0082343 A1* | 4/2004 | Kim | H04M 1/72412 | 370/349 |
| 2006/0189272 A1* | 8/2006 | Willenegger | H04W 52/322 | 455/3.01 |
| 2006/0198325 A1* | 9/2006 | Gao | H04L 1/0057 | 370/216 |
| 2012/0155346 A1* | 6/2012 | Matsumoto | H04W 72/1242 | 370/310 |
| 2012/0310395 A1* | 12/2012 | El-Hoiydi | H04W 48/16 | 700/94 |
| 2017/0374533 A1 | 12/2017 | Batra et al. | | |

OTHER PUBLICATIONS

Connectionless Broadcast Channel and Mobility of Bluetooth—Published in: Vehicular Technology Conference, IEEE 55th Vehicular Technology Conference, VTC, Date of Conference: May 6-9, 2002 (cat. No. 02CH37367) (Year: 2002).*

Bluetooth SIG: "Bluetooth Core Specification v5.0", Dec. 6, 2016 (Dec. 6, 2016), pp. 1, 193, 441-442,488-489, XP002794739, vol. 2, Part B, Retrieved from the Internet: URL: https://www.bluetooth.com/specifications/archived-specifications/ [retrieved on Oct. 4, 2019], p. 441, Section 7.6.5—p. 442; Figure 7.16, p. 488, Section 8.10—p. 489; Figure 8.25.

International Search Report and Written Opinion—PCT/US2019/045119—ISA/EPO—dated Oct. 16, 2019.

Kim Y., et al., "Connectionless Broadcast Channel and Mobility of Bluetooth", Proceedings of the IEEE 55th Vehicular Technology Conference, VTC Spring 2002, Birmingham, AL, May 6-9, 2002; [IEEE Vehicular Technology Conference], New York, NY, IEEE, US, vol. 2, May 6, 2002 (May 6, 2002), pp. 918-922, XP001214427, ISBN 978-0-7803-7484-3, p. 920, section 2.3.

Liang J., et al., "Performance Analysis and Reliability Improvement of Bluetooth Broadcast Scheme", Pervasive Computing and Applications, Aug. 1, 2006 (Aug. 1, 2006), pp. 775-780, XP031014534, 2006 1st International Symposium ON, IEEE, PI ISBN: 978-1-4244-0325-7, p. 776, Section 3; Figure 2.

* cited by examiner

BLUETOOTH CONNECTIONLESS SLAVE BROADCAST BURST MODE

CROSS-REFERENCE TO RELATED APPLICATION(S)

This application claims the benefit of U.S. Provisional Application Ser. No. 62/732,554, entitled "Bluetooth Connectionless Slave Broadcast Burst Mode" and filed on Sep. 17, 2018, which is expressly incorporated by reference herein in its entirety.

BACKGROUND

Field

The present disclosure relates generally to communication systems, and more particularly, to a Bluetooth connectionless slave broadcast burst mode.

Background

A wireless personal area network (WPAN) is a personal, short-range wireless network for interconnecting devices centered around a specific distance from a user. WPANs have gained popularity because of the flexibility and convenience in connectivity that WPANs provide. WPANs, such as those based on short-range communication protocols (e.g., a Bluetooth® (BT) protocol, a Bluetooth® Low Energy (BLE) protocol, a Zigbee® protocol, etc.), provide wireless connectivity to peripheral devices by providing wireless links that allow connectivity within a specific distance (e.g., 5 meters, 10 meters, 20 meters, 100 meters, etc.).

BT is a short-range wireless communication protocol that may support a WPAN between a wireless device (e.g., a master device) and at least one peripheral device (e.g., a slave device). There are two forms of BT wireless technology systems: Basic Rate (BR) and Low Energy (LE). Both systems include device discovery, connection establishment, and connection mechanisms. The BR system includes optional Enhanced Data Rate (EDR), Alternate Media Access Control (MAC), and Physical (PHY) layer extensions. The BR system offers synchronous and asynchronous connections with data rates of 721.2 kbps for BR, 2.1 Mbps for EDR, and high speed operation up to 54 Mbps with 802.11 AMP. The LE system includes features designed to enable products that require lower current consumption than BR/EDR. A master BR/EDR device may communicate with a maximum of seven slaves in a wireless network (e.g., piconet).

Bluetooth Connectionless Slave Broadcast (CSB) mode allows a master device to broadcast data to any number of connected slave devices, such that the master device may be able to communication with more than seven slaves. However, the master device in CSB mode may only broadcast one packet to slave devices during a CSB interval, such that the master device must wait to broadcast the next packet until the completion of the CSB interval. This may lead to higher latency and inefficient Bluetooth channel occupancy. There is a need for further improvements to CSB technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Bluetooth CSB mode was developed to address the transmission of large payloads such that a master device may broadcast packets to zero or more slave devices. In CSB mode, the master device reserves a logical transport that may be used for CSB traffic. In CSB mode, the master device transmits packets at specified intervals requested by a Host in master-to-slave transmission slots. The Host (e.g., master device) may provide CSB data through Host Controller Interface (HCI) commands. HCI commands have size limitations, such that a single command cannot carry the maximum payloads allowed by larger packets. As such, HCI commands for CSB allow fragmentation of large payloads at the HCI level. While traditional CSB offers certain advantages, there exists a need for further improvements in CSB technology.

For example, in traditional CSB mode, a master device may start broadcasting CSB data at a CSB instant. CSB instants may be separated by a CSB interval, which is a period of time in which the CSB data may be broadcasted to at least one slave device. In CSB mode, only a single packet of data may be broadcasted in the CSB interval, such that the master device must wait until the completion of the CSB interval to broadcast the next packet of data. Since only a single packet of data is broadcasted in a CSB interval, traditional CSB mode is inherently inefficient because a single packet may not occupy all of the time slots in a CBS interval, and hence, the unused time slots may be wasted when the master device has multiple packets to broadcast.

Thus, there exists a need for a mechanism that enables a master device to use as many of the available time slots as possible within a CSB interval while operating in CSB mode.

The present disclosure provides a mechanism to perform a CSB burst mode between a master device and one or more slave devices. In CSB burst mode, the master device may broadcast more than one packet of data in a CSB interval, instead of being limited to broadcasting only one packet of data during the CSB interval. In CSB burst mode, the master device may use the time slots in a CSB interval more efficiently than while operating in traditional CSB mode. CSB burst mode of the present disclosure may be used to improve the latency and duty cycle of data transmissions, such as for example, broadcast audio.

In an aspect of the disclosure, a method, a computer-readable medium, and an apparatus are provided. The apparatus may determine to broadcast a set of packets during a CSB interval, where the set of packets includes a plurality of packets. In some aspects, the apparatus may broadcast the set of packets during the CSB interval to a set of second nodes. In certain aspects, the apparatus may generate the set of packets using erasure coding.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
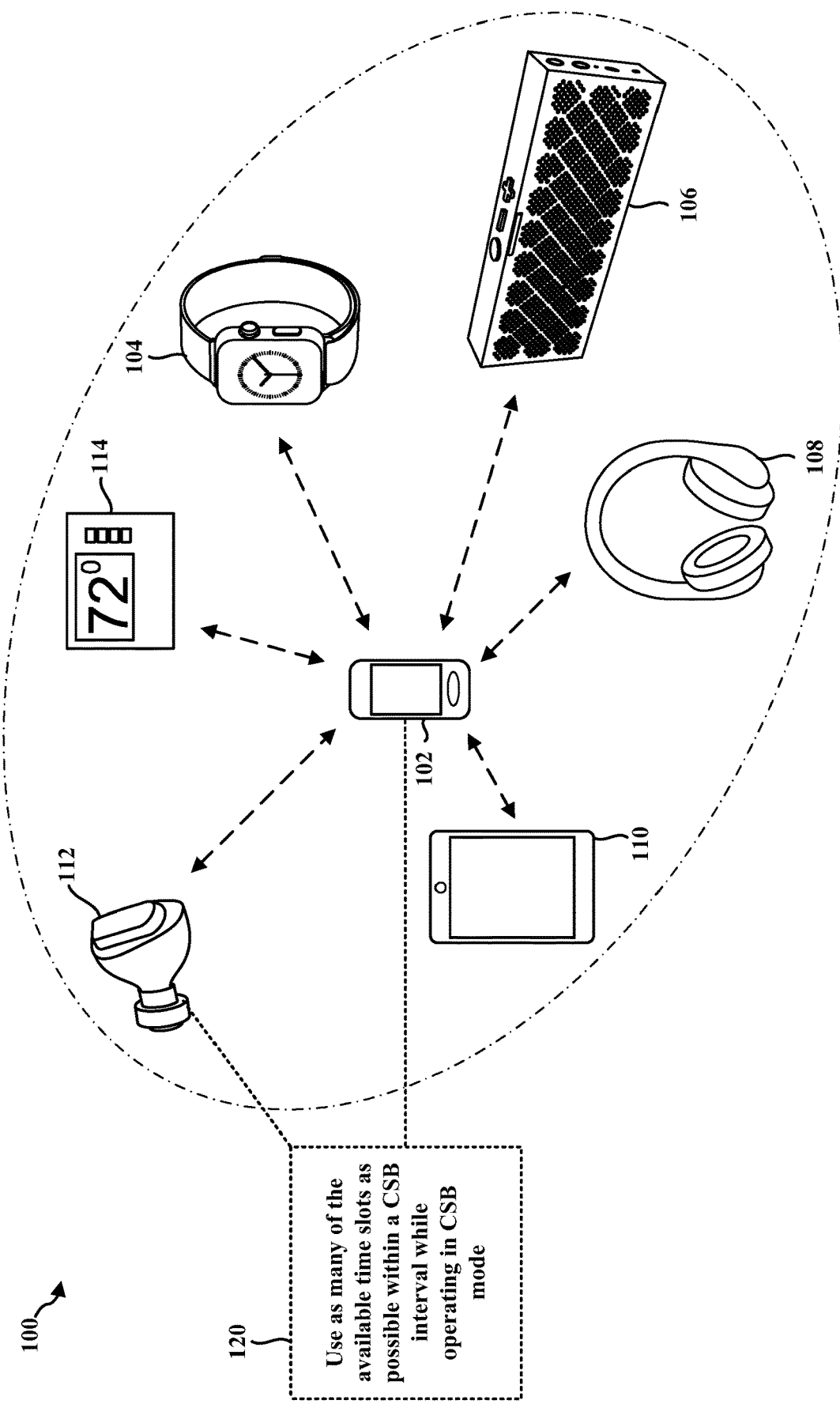
FIG. 1 is a diagram illustrating an example of a WPAN in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates an example WPAN 100 in accordance with certain aspects of the disclosure. Within the WPAN 100, a wireless device 102 may use a logical link 116 to communicate with one or more peripheral devices 104, 106, 108, 110, 112, 114 using a short-rage wireless communications protocol. The short-rage wireless communications protocol may include BT protocol or a modified BLE protocol.

The wireless device 102 may include suitable logic, circuitry, interfaces, processors, and/or code that may be used to communicate with one or more peripheral devices 104, 106, 108, 110, 112, 114 using the BLE protocol or the modified BLE protocol as described below in connection with any of FIGS. 2-11. The wireless device 102 may operate as an initiator to request establishment of a link layer (LL) connection with an intended peripheral device 104, 106, 108, 110, 112, 114.

A LL in the BLE protocol stack and/or modified BLE protocol stack (e.g., see FIG. 3) provides, as compared to BT, ultra-low power idle mode operation, simple device discovery and reliable point-to-multipoint data transfer with advanced power-save and encryption functionalities. After a requested LL connection is established, the wireless device 102 may become a master device and the intended peripheral device 104, 106, 108, 110, 112, 114 may become a slave device for the established LL connection. As a master device, the wireless device 102 may be capable of supporting multiple LL connections at a time with various peripheral devices 104, 106, 108, 110, 112, 114 (slave devices). The wireless device 102 (master device) may be operable to manage various aspects of data packet communication in a LL connection with an associated peripheral device 104, 106, 108, 110, 112, 114 (slave device). For example, the wireless device 102 may be operable to determine an operation schedule in the LL connection with a peripheral device 104, 106, 108, 110, 112, 114. The wireless device 102 may be operable to initiate a LL protocol data unit (PDU) exchange sequence over the LL connection. LL connections may be configured to run periodic connection events in dedicated data channels. The exchange of LL data PDU transmissions between the wireless device 102 and one or more of the peripheral devices 104, 106, 108, 110, 112, 114 may take place within connection events.

In certain configurations, the wireless device 102 may be configured to transmit the first LL data PDU in each connection event to an intended peripheral device 104, 106, 108, 110, 112, 114. In certain other configurations, the wireless device 102 may utilize a polling scheme to poll the intended peripheral device 104, 106, 108, 110, 112, 114 for a LL data PDU transmission during a connection event. The intended peripheral device 104, 106, 108, 110, 112, 114 may transmit a LL data PDU upon receipt of packet LL data PDU from the wireless device 102. In certain other configurations, a peripheral device 104, 106, 108, 110, 112, 114 may transmit a LL data PDU to the wireless device 102 without first receiving a LL data PDU from the wireless device 102.

Examples of the wireless device 102 may include a cellular phone, a smart phone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player (e.g., MP3 player), a camera, a game console, a tablet, a smart device, a wearable device (e.g., smart watch, wireless headphones, etc.), a vehicle, an electric meter, a gas pump, a toaster, a thermostat, a hearing aid, a blood glucose on-body unit, an Internet-of-Things (IoT) device, or any other similarly functioning device.

Examples of the one or more peripheral devices 104, 106, 108, 110, 112, 114 may include a cellular phone, a smart phone, a SIP phone, a STA, a laptop, a PC, a desktop computer, a PDA, a satellite radio, a global positioning system, a multimedia device, a video device, a digital audio player (e.g., MP3 player), a camera, a game console, a tablet, a smart device, a wearable device (e.g., smart watch, wireless headphones, etc.), a vehicle, an electric meter, a gas pump, a toaster, a thermostat, a hearing aid, a blood glucose on-body unit, an IoT device, or any other similarly functioning device. Although the wireless device 102 is illustrated in communication with six peripheral devices 104, 106, 108, 110, 112, 114 in the WPAN 100, the wireless device 102 may communicate with more or fewer than six peripheral devices within the WPAN 100 without departing from the scope of the present disclosure.

A device (e.g., wireless device 102) implementing the BT protocol may operate according to one radio mode, such as BR/EDR, and a device implementing the BLE protocol may operate according to a BLE radio mode. In some aspects, a device (e.g., wireless device 102) may be configured with dual radio modes, and may be able to operate according to the BR/EDR mode or the BLE mode, based on the type of short-range wireless communication in which the device may engage.

Referring again to FIG. 1, in certain aspects, the wireless device (e.g., master device) may be configured to use as many of the available time slots as possible within a CSB interval while operating in CSB mode (120), e.g., as described below in connection with any of FIGS. 2-11.

Figure 2:
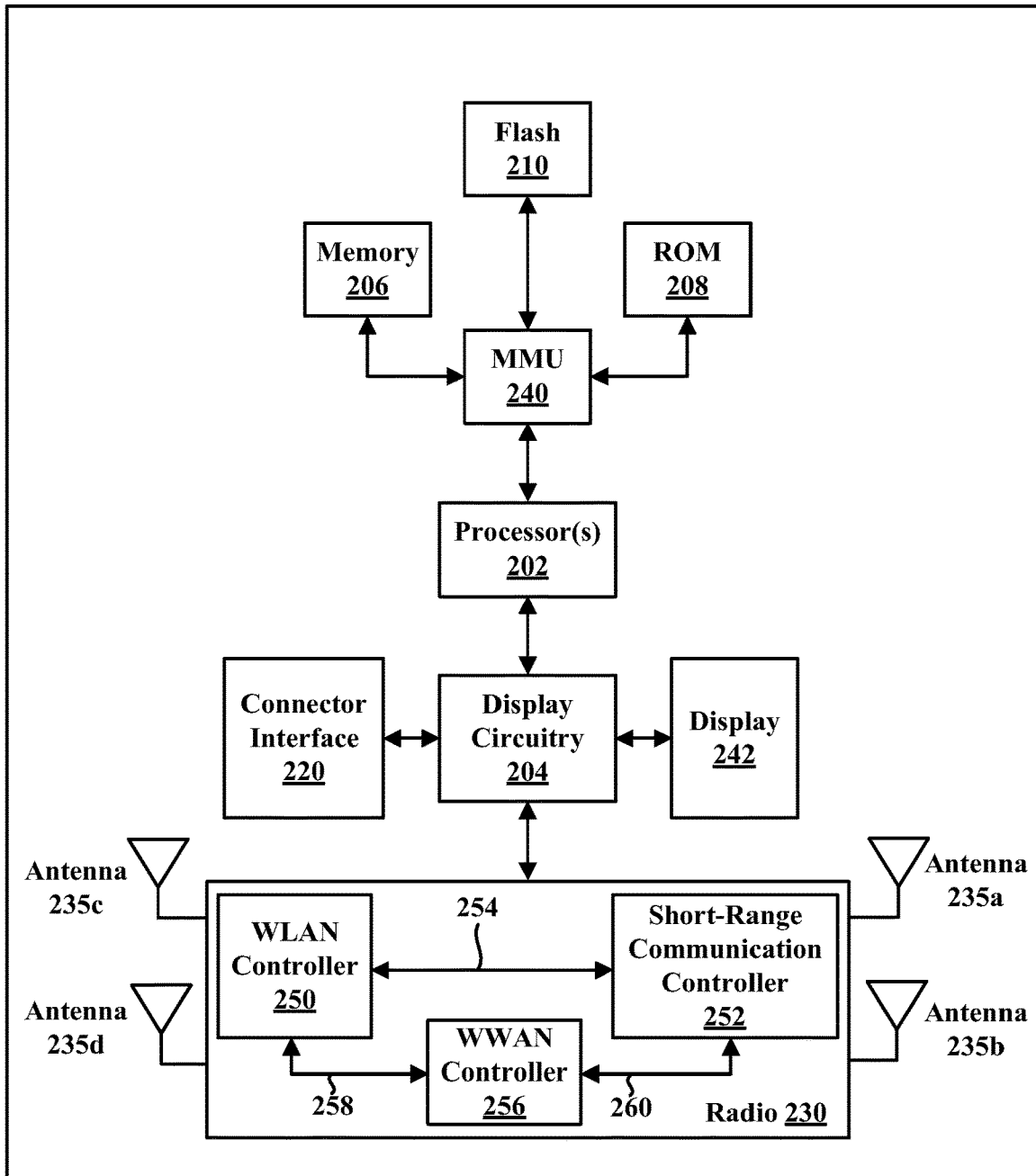
FIG. 2 is block diagram of a wireless device in accordance with certain aspects of the disclosure.

FIG. 2 is block diagram of a wireless device 200 in accordance with certain aspects of the disclosure. The wireless device 200 may correspond to, e.g., the wireless device 102, and/or one of peripheral devices 104, 106, 108, 110, 112, 114 described above in connection with FIG. 1. In certain aspects, the wireless device 200 may be a BT enabled device.

As shown in FIG. 2, the wireless device 200 may include a processing element, such as processor(s) 202, which may execute program instructions for the wireless device 200. The wireless device 200 may also include display circuitry 204 which may perform graphics processing and provide display signals to the display 242. The processor(s) 202 may also be coupled to memory management unit (MMU) 240, which may be configured to receive addresses from the processor(s) 202 and translate the addresses to address locations in memory (e.g., memory 206, ROM 208, Flash memory 210) and/or to address locations in other circuits or devices, such as the display circuitry 204, radio 230, connector interface 220, and/or display 242. The MMU 240 may be configured to perform memory protection and page table translation or set up. In some embodiments, the MMU 240 may be included as a portion of the processor(s) 202.

As shown, the processor(s) 202 may be coupled to various other circuits of the wireless device 200. For example, the wireless device 200 may include various types of memory, a connector interface 220 (e.g., for coupling to the computer system), the display 242, and wireless communication circuitry (e.g., for Wi-Fi, BT, BLE, cellular, etc.). The wireless device 200 may include a plurality of antennas 235a, 235b, 235c, 235d, for performing wireless communication with, e.g., wireless devices in a WPAN.

In certain aspects, the wireless device 200 may include hardware and software components (a processing element) configured to broadcast more than one packet and use as many of the available time slots as possible within a CSB interval while operating in CSB mode, e.g., using the techniques described below in connection with any FIGS. 3-11. The wireless device 200 may also comprise BT and/or BLE firmware or other hardware/software for controlling BT and/or BLE operations.

The wireless device 200 may be configured to implement part or all of the techniques described below in connection with any of FIGS. 3-11, e.g., by executing program instructions stored on a memory medium (e.g., a non-transitory computer-readable memory medium) and/or through hardware or firmware operation. In other embodiments, the techniques described below in connection with any of FIGS. 3-11 may be at least partially implemented by a programmable hardware element, such as an field programmable gate array (FPGA), and/or an application specific integrated circuit (ASIC).

In certain aspects, radio 230 may include separate controllers configured to control communications for various respective radio access technology (RAT) protocols. For example, as shown in FIG. 2, radio 230 may include a WLAN controller 250 configured to control WLAN communications, a short-range communication controller 252 configured to control short-range communications, and a WWAN controller 256 configured to control WWAN communications. In certain aspects, the wireless device 200 may store and execute a WLAN software driver for controlling WLAN operations performed by the WLAN controller 250, a short-range communication software driver for controlling short-range communication operations performed by the short-range communication controller 252, and/or a WWAN software driver for controlling WWAN operations performed by the WWAN controller 256.

In certain implementations, a first coexistence interface 254 (e.g., a wired interface) may be used for sending information between the WLAN controller 250 and the short-range communication controller 252. In certain other implementations, a second coexistence interface 258 may be used for sending information between the WLAN controller 250 and the WWAN controller 256. In certain other implementations, a third coexistence interface 260 may be used for sending information between the short-range communication controller 252 and the WWAN controller 256.

In some aspects, one or more of the WLAN controller 250, the short-range communication controller 252, and/or the WWAN controller 256 may be implemented as hardware, software, firmware or some combination thereof.

In certain configurations, the WLAN controller 250 may be configured to communicate with a second device in a WPAN using a WLAN link using all of the antennas 235a, 235b, 235c, 235d. In certain other configurations, the short-range communication controller 252 may be configured to communicate with at least one second device (e.g., slave device) in a WPAN using one or more of the antennas 235a, 235b, 235c, 235d. In certain other configurations, the WWAN controller 256 may be configured to communicate with a second device in a WPAN using all of the antennas 235a, 235b, 235c, 235d. The short-range communication controller 252 may be configured to broadcast more than one packet and use as many of the available time slots as possible within a CSB interval while operating in CSB mode.

Figure 3:
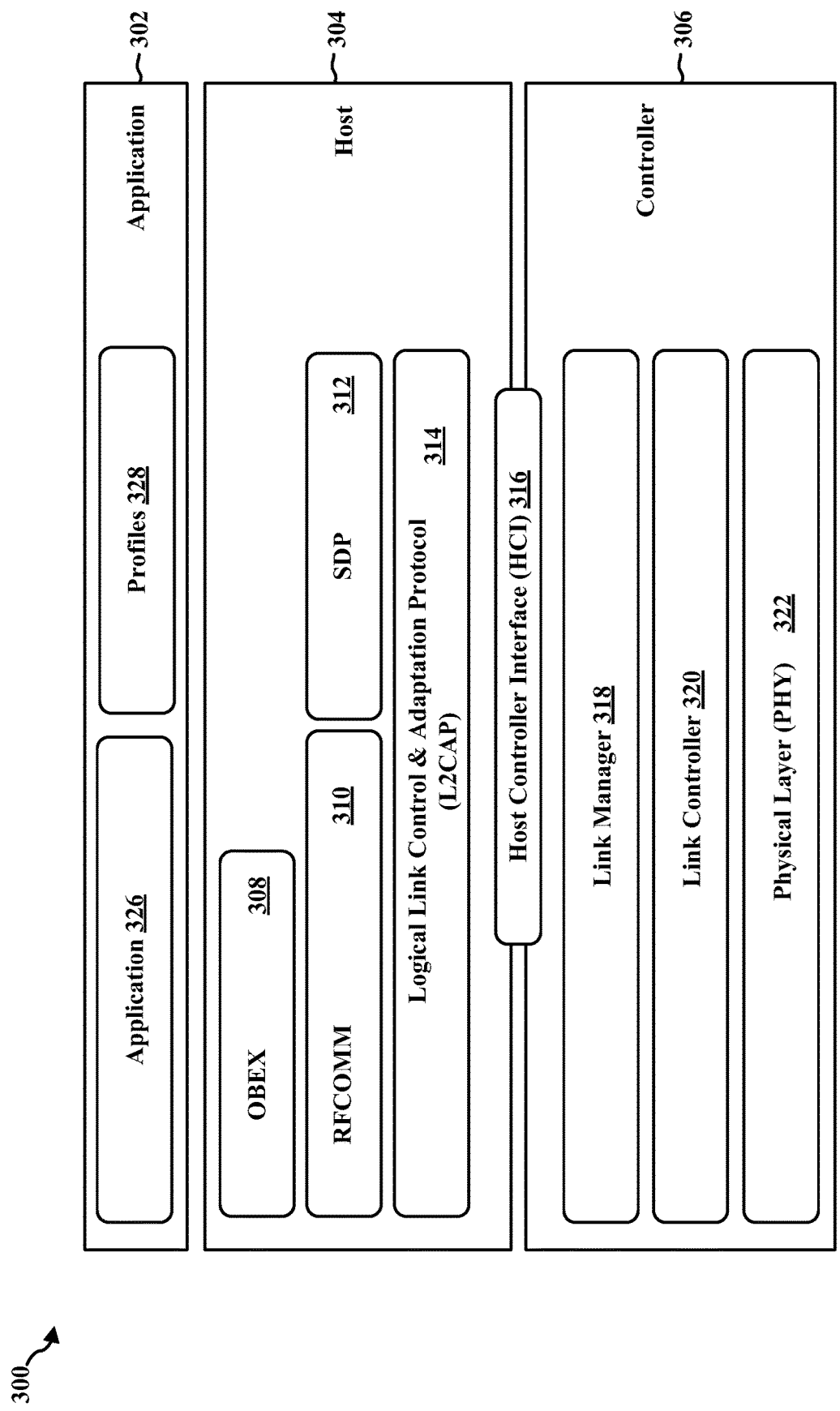
FIG. 3 is a diagram illustrating a modified BLE protocol stack in accordance with certain aspects of the disclosure.

FIG. 3 illustrates a BT protocol stack 300 that may be implemented in a wireless device in accordance with certain aspects of the present disclosure. For example, the BT protocol stack 300 may be implemented by, e.g., one or more of processor(s) 202, memory 206, Flash memory 210, ROM 208, the radio 230, and/or the short-range communication controller 252 illustrated in FIG. 2.

Referring to FIG. 3, the BT protocol stack 300 may be organized into lower layer(s), a middle layer(s), and upper layer(s). The lower layer(s) of the BT protocol stack 300 may include a controller stack 306, which may be used for, inter alia, hardware interface management, link establishment, and link management. The middle layer(s) of the BT protocol stack 300 may include a host stack 304, which may be used for, inter alia, application (layer) interface management to allow an application (layer) to access short-range wireless communications. The higher layer(s) of the BT protocol stack 300 may include an application layer 302, which may include one or more applications and one or more profiles that allow the one or more applications to use BT communications.

The controller stack 306 may include a physical (PHY) layer 322. The PHY layer 322 may include, for example, a radio and/or a baseband processor. In some aspects, the PHY layer 322 may define the mechanism for transmitting a bit stream over a physical link or channel that connects BT devices. The bit stream may be grouped into code words or symbols, and converted to a data packet that is transmitted over a wireless transmission medium. The PHY layer 322 may provide an electrical, mechanical, and/or procedural interface to the wireless transmission medium. The PHY layer 322 may be responsible for modulation and demodulation of data into radio frequency (RF) signals for transmission over the air. The PHY layer 322 may describe the physical characteristics of a wireless device's receiver/transmitter. The physical characteristics may include modulation characteristics, radio frequency tolerance, sensitivity level, etc.

The link manager 318 may translate host controller interface (HCI) 316 commands into controller-level operations (e.g., baseband-level operations). The link manager 318 may be responsible for establishing and configuring links and managing power-change requests, among other tasks. Each type of logical link (e.g., ACL links, A2DP links, SCO links, eSCO links, ISO links, etc.) may be associated with a specific packet type. For example, an SCO link may provide reserved channel bandwidth for communication between a master device and a slave device, and support regular, periodic exchange of data packets with no retransmissions. An eSCO link may provide reserved channel bandwidth for communication between a master device and a slave device, and support regular, periodic exchange of data packets with retransmissions. An ACL link may exist between a master device and a slave device from the beginning of establishment of a connection between the master device and the slave device, and the data packets for ACL links may include encoding information in addition to a payload.

The link manager 318 may communicate with the host stack 304 through a host controller interface (HCI) 316—e.g., the link manager 318 may translate HCI 316 commands into controller-level operations (e.g., baseband-level operations). The HCI 316 may act as a boundary between the lower layers (e.g., the controller stack 306) of the BT protocol stack 300 and the other layers of the BT protocol stack (e.g., the host stack 304 and the application layer 302). The BT specification may define a standard HCI to support BT systems that are implemented across two separate processors. For example, a BT system on a computer might use a processor of a BT component to implement the upper layers of the stack (e.g., the host stack 304 and the application layer 302). The BT system might then use the BT system's own processor to implement the other layers (e.g., the PHY layer 322, the link controller 320, and/or the link manager 318). In some aspects, however, the BT system may be implemented on a same processor, and such a BT system may be referred to as "hostless."

The host stack 304 may include at least a Logical Link Control and Adaptation Protocol (L2CAP) layer 314, a service discovery protocol (SDP) layer 312, a radio frequency communication (RFCOMM) layer 310, and an object exchange (OBEX) layer 316. The L2CAP layer 314 is implemented above the HCI 316, and may communicate through the HCI 316. The L2CAP layer 314 may be primarily responsible for establishing connections across some existing links (e.g., logical links, including ACL links) and/or requesting some links (e.g., logical links, including ACL links) if those do not already exist. Further, the L2CAP layer 314 may implement multiplexing between different higher-layer protocols, such as SDP protocols and RFCOMM protocols, which may to allow different applications to use a single link (e.g., a logical link, including an ACL link). In addition, the L2CAP layer 314 may repackage data packets received from higher layers into a format expected by lower layers. The L2CAP layer 314 may employ the concept of channels to keep track of where data packets come from and where data packets should go. A channel may be a logical representation of the data flow or stream between the L2CAP layer 314 at a transmitting device (e.g., a master device) and another L2CAP layer 314 at a receiving device (e.g., a slave device).

The SDP layer 312 may define actions for both servers and clients of BT services. The BT specification defines a service as any feature that may be usable by another (remote) BT device. An SDP client may communicate with an SDP server using a reserved channel on an L2CAP link to discover what services are available. When the SDP client finds the desired service, the SDP client may request a separate connection to use the service. The reserved channel may be dedicated to SDP communication so that a device knows how to connect to the SDP service on any other device. An SDP server may maintain an SDP database, which may include a set of service records that describe the services the SDP server offers. Along with information describing how an SDP client can connect to the service, the service records may contain a universally unique identifier (UUID) of the service.

The RFCOMM layer 310 may emulate the serial cable line settings and status of an RS-232 serial port. The RFCOMM layer 310 may connect to the lower layers of the BT protocol stack 300 through the L2CAP layer 314. By providing serial-port emulation, the RFCOMM layer 310 may support legacy serial-port applications. The RFCOMM layer 310 may also support the Object Exchange (OBEX) layer 308.

The OBEX layer 308 may define a communication protocol that may be used by devices to exchange data objects, and the data objects may also be defined by the OBEX layer 308. A BT device that wants to set up an OBEX communication session with another device may be considered the client device. The client initially may send one or more SDP requests to ensure that the other device can act as a server of OBEX services. If the server device can provide OBEX services, the server device may respond with the OBEX service record of the server device. The OBEX service record may contain an RFCOMM channel number that the client device may use to establish an RFCOMM channel. Further communication between the two devices may be conveyed in packets, which may contain requests, responses, and/or data. The format of the packet may be defined by the OBEX session protocol.

The application layer 302 may include at least one application 326, with which a user may interact and which may access BT communications for various functionality. The application 326 may access BT communications through one or more profiles 328, which may describe a variety of different types of tasks. By following procedures of one or more profiles 328, the application 326 may use BT communications according to a BT specification.

CSB mode may be deployed in applications in which the transmission of large payloads may occur such that a master device may broadcast packets to zero or more slave devices. In CSB mode, the master device reserves a logical transport that may be used for CSB traffic. The CSB traffic is transmitted in accordance with a timing and frequency schedule. The master device transmits a synchronization train which includes the timing and frequency schedule on a synchronization scan channel. In order to receive the broadcasts, the one or more slave devices implements a synchronization procedure. In this synchronization procedure, the one or more slave devices listens to the synchronization scan channel in order to receive the synchronization train from the master device. This enables the one or more slave devices to determine the Bluetooth clock of the master device and the timing and frequency schedule of the broadcast packets. The one or more slave devices synchronizes its Bluetooth clock to that of the master device for the purposes of receiving the CSB traffic. The one or more slave devices may then stop listening for synchronization train packets. The one or more slave devices opens its receive window in accordance with the timing and frequency schedule determined from the synchronization procedure in order to receive the CSB traffic from the master device.

In CSB mode, the master device transmits packets at specified intervals requested by a Host in master-to-slave transmission slots. The Host (e.g., master device) may provide CSB data through HCI commands. HCI commands have size limitations (e.g., 255 bytes), such that a single command cannot carry the maximum payloads allowed by larger packets (e.g., DH5). As such, HCI commands for CSB allow fragmentation of large payloads at the HCI level.

While traditional CSB offers certain advantages, there exists a need for further improvements in CSB technology.

For example, in traditional CSB mode, a master device may start broadcasting CSB data at a CSB instant. CSB instants may be separated by a CSB interval, which is a period of time in which the CSB data may be broadcasted to at least one slave device. In CSB mode, a single packet of data may be broadcasted in the CSB interval. Since only a single packet of data is broadcasted in a CSB interval, traditional CSB mode is inherently inefficient because a single packet may not occupy all of the time slots in a CBS interval, and hence, the unused time slots may be wasted when the master device has multiple packets to broadcast. CSB may be considered to be unreliable due to slave devices not being able to acknowledge receipt of the CSB data packets sent by the master device or slave devices not being able to request a re-transmission of packets since CSB is unidirectional. To improve reliability, each CSB data packet may be transmitted a number of times.

Thus, there exists a need for a mechanism that enables a master device to use as many of the available time slots as possible within a CSB interval while operating in CSB mode.

The present disclosure provides a mechanism to perform a CSB burst mode between a master device and one or more slave devices. In CSB burst mode, the master device may broadcast more than one packet of data in a CSB interval, and hence, may use the time slots in a CSB interval more efficiently than while operating in traditional CSB mode. CSB burst mode of the present disclosure may be used to improve the latency and duty cycle of data transmissions, such as for example, broadcast audio.

Figure 4:
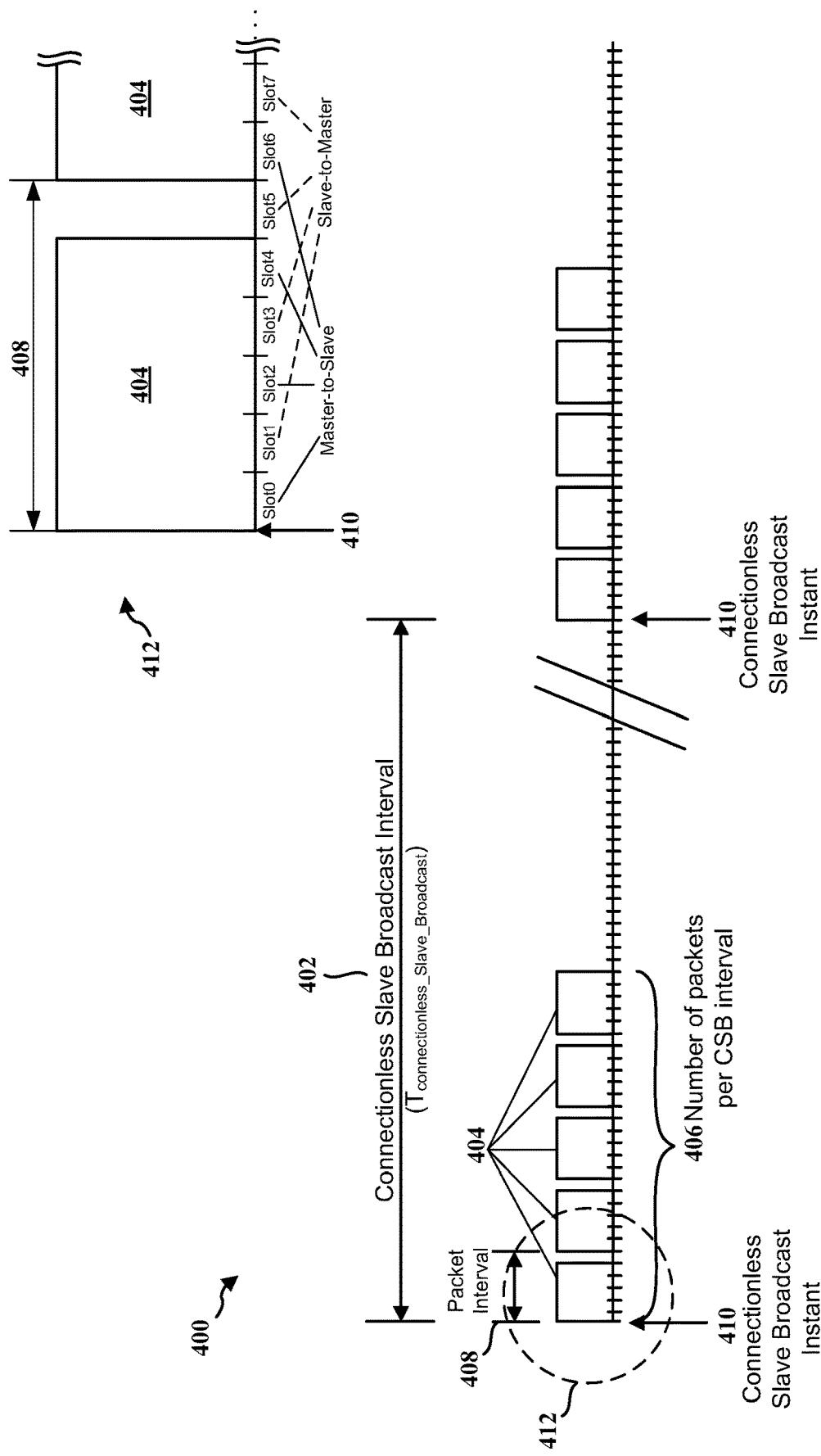
FIG. 4 is a diagram illustrating an air interface packet that may be generated in accordance with certain aspects of the disclosure.

FIG. 4 is a diagram illustrating an example 400 of a CSB burst mode in accordance with certain aspects of the disclosure. As seen in FIG. 4, the CSB burst mode may allow a master device to broadcast more than one packet 404 per CSB interval 402, as opposed to only being allowed to broadcast one packet in conventional CSB mode. In CSB burst mode, the master may broadcast the one or more packets 404 to any number of slave devices. The one or more packets 404 may be broadcasted as a set or a number 406 of packets during the CSB interval 402, with each packet 404 having a packet interval 408. The master may commence broadcasting the one or more packets 404 at a CSB instant 410. The CSB burst mode is configured to allow for communications between the master and the one or more slaves in a WPAN in accordance with certain aspects of the disclosure. The master device may correspond to, e.g., wireless device 102, peripheral device 104, 106, 108, 110, 112, 114, wireless device 200, the apparatus 1002/1002', or the mesh node 1050. The slave devices may correspond to, e.g., wireless device 102, peripheral device 104, 106, 108, 110, 112, 114, wireless device 200, the apparatus 1002/1002', or the mesh node 1050.

Referring to FIG. 4, the CSB interval 402 may have a number of slots that are provided to allow for the broadcasting of the one or more packets 404. In some aspects, the CSB interval 402 may be any value between the range of 0x0002 to 0xFFFE slots. In some aspects, the CSB interval 402 may be any even value between the range of 0x0002 to 0xFFFE slots, which is consistent with Bluetooth Core Specification 5.0, Volume 2, Part B, Section 8.10.1.

The one or more packets 404 may be of the same packet type. For example, the one or more packets 404 may be a basic rate packet type, an enhanced data rate (EDR) packet type, a Bluetooth LE packet type, or a proprietary packet type. The one or more packets 404 may be broadcasted based on a packet interval 408. Each of the one or more packets 404 may have the same packet interval 408. In the aspect of FIG. 4, the packets 404 have a packet interval 408 of six slots, such that the packets 404 are broadcasted, by the master, six slots after the broadcast of the preceding packet 404, or stated differently, the packets 404 are broadcasted at every sixth slot based on the number of packets to be broadcasted. In some aspects, the packet interval may be any value within the range of 0x02 to 0xFF slots. In the aspect of FIG. 4, each packet 404 may be a 5-slot packet 404 and the master may be configured to broadcast each packet 404 at a 6-slot packet interval 408. As such, the broadcasting of each packet 404 ends at the fifth slot, resulting in a 1-slot gap between the broadcasting of the next packet 404 and the preceding packet 404. In the aspect of FIG. 4, the master may be configured to broadcast a set or number 406 of five packets 404 per CSB interval 402, where each packet 404 may be a 5-slot packet and transmitted at a 6-slot interval.

The set or number 406 of packets broadcasted within the CSB interval 402, in the aspect of FIG. 4 is 5. However, the disclosure is not intended to be limited to the aspects disclosed herein. In some aspects the set or number 406 of packets that may be broadcasted within the CSB interval 402 may be any value from the range of 0x01 to 0xFF slots, so long as the CSB interval is greater than the set or number 406 of packets broadcasted within the CSB interval 402.

The master may commence broadcasting a first packet 404 of the one or more packets 404 at a CSB instant 410. CSB instants 410 may be separated by the CSB interval 402, where the bounds of the CSB interval 402 may be based on the CSB instants 410. In some aspects, a first CSB instant 410 is separated from a second CSB instant 410 by a first CSB interval 402. In some aspects, the CSB instants 410 may be on a master-to-slave slot. In yet some aspects, the CSB instants 410 may always be on a master-to-slave slot, such that the master starts broadcasting the first packet 404 on a master-to-slave slot. For example, in the aspect of FIG. 4, each packet may be a 5-slot packet 404 having a 6-slot packet interval 408, and a first CSB instant 410 falls on a master-to-slave slot (e.g., slot0). The portion 412 of FIG. 4 provides an example of an enlarged view of the first packet 404 and the packet interval 408. In the portion 412, the individual slots are identified and labeled as either a Master-to-Slave slot or a Slave-to-Master slot. The Master-to-Slave slots are even numbered slots, while the Slave-to-Master slots are odd numbered slots. Different line types are used to identify the Master-to-Slave and Slave-to-Master slots for ease of clarity. The master starts broadcasting the first 5-slot packet 404 at slot0 and ends the broadcast at slot4. The following slot, slot5, is a slave-to-master slot because it is an odd numbered slot. The 5-slot packet 404 having a 6-slot packet interval allows the slot5 or the slave-to-master slot to be skipped and/or unused. As such, a second 5-slot packet 404 may be broadcasted on an even numbered slot (e.g., slot6) or a master-to-slave slot. Thus, in the aspect of FIG. 4, the packets 404 may be broadcasted after a 1-slot gap, such that the packets are broadcasted on a master-to-slave slot until all the packets 404 have been broadcasted. After the last of the packets 404 has been broadcasted by the master in CSB burst mode, there may be a gap of one or more slots until the end of the CSB interval 402. At which point the master may be able to broadcast any other packets 404 using CSB burst mode at the next CSB instant 410. Having a packet interval that is one slot greater than the packet length may provide a gap between packets in instances where the gap would fall on a slave-to-master slot, which provides the advantage of packets being configured to be broadcasted on master-to-slave slots.

The packets 404 may be configured in many different configurations and are not intended to be limited to the aspects disclosed herein. In some aspects, the packet 404 may be a 1-slot or a 3-slot packet and may have a 2-slot or a 4-slot packet interval, respectively. In such aspects, the slave-to-master slot following each packet is unused (e.g., no transmission by the master), due to the packet interval being 1-slot greater than the packet length, such that the packets have a packet interval configured to start on a master-to-slave slot (e.g., even numbered slot) and end on a slave-to-master slot (e.g., odd numbered slot), or stated differently, packets 404 may be configured to have a packet interval 408 that spans an even number of slots. The packet interval 408 spanning an even number of slots provides the advantage of packets being configured to be broadcasted by the master in CSB burst mode on master-to-slave slots.

Figure 5:
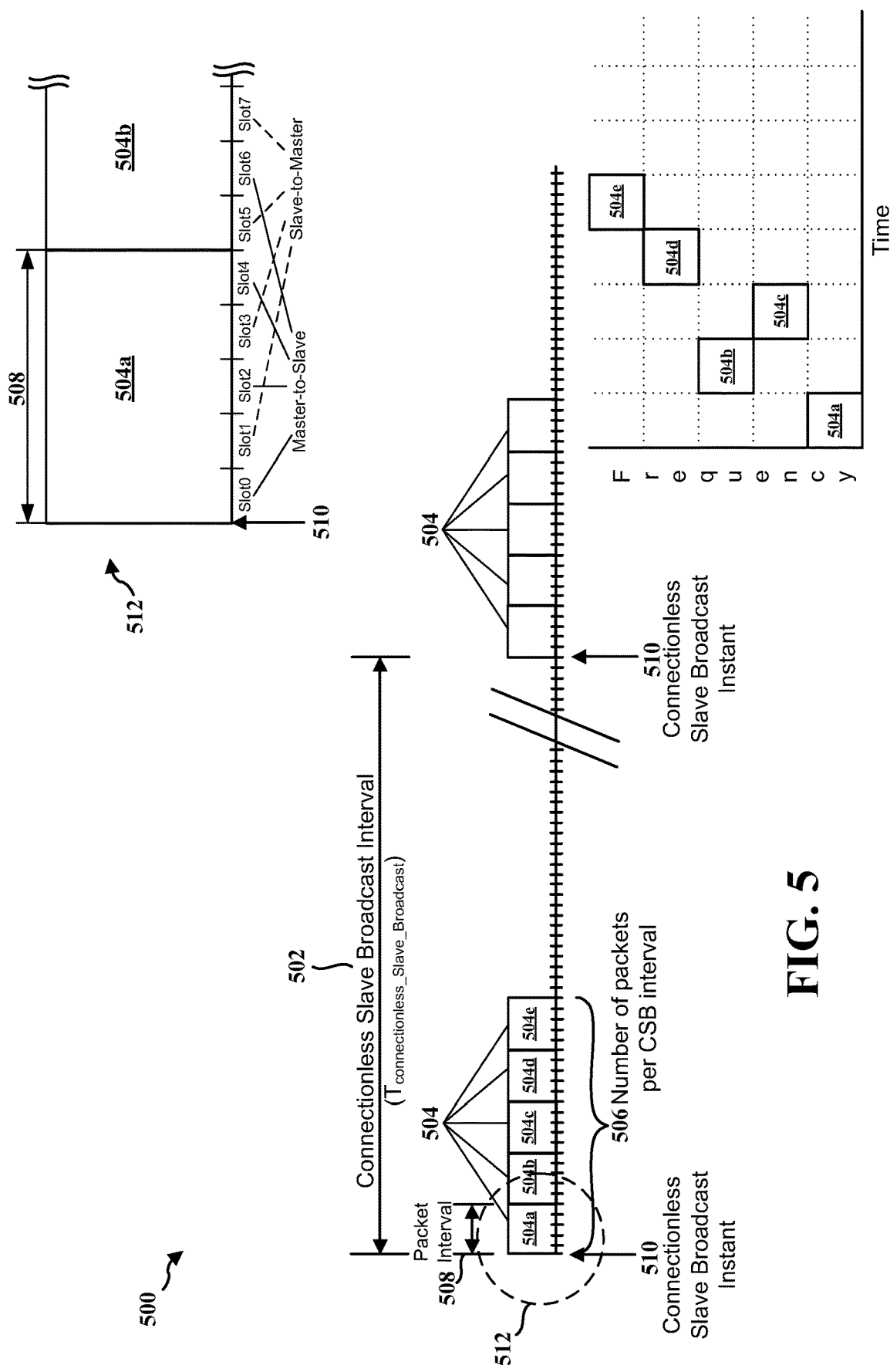
FIG. 5 is a diagram illustrating an air interface packet that may be generated in accordance with certain aspects of the disclosure.

FIG. 5 is a diagram illustrating an example 500 of a CSB burst mode in accordance with certain aspects of the disclosure. The example 500 of FIG. 5 may be configured to have some similarities to the example 400 of FIG. 4 in that the CSB burst mode may allow a master device to broadcast one or more packets 504 per CSB interval 502. The example 500 of FIG. 5 may also include a CSB interval 502, one or more packets 504, a set or number of packets 506 broadcasted during the CSB interval 502, a packet interval 508, and CSB instants 510, similarly as discussed in the aspect of FIG. 4. However, in the aspect of FIG. 5, each packet (e.g., 504a-e) may be configured as a 5-slot packet and configured to have a 5-slot packet interval 508, or stated differently, the length of the packet (e.g., 504a-e) and the packet interval 508 are the same, such that a gap or unused slot, as discussed in the aspect of FIG. 4, is not present between the broadcasting of packets 504.

In the aspect of FIG. 5, the master may commence broadcasting a first packet 504a of the one or more packets 504 at a CSB instant 510. The portion 512 of FIG. 5 provides an example of an enlarged view of the first packet 504a and the packet interval 508. In the portion 512, the individual slots are identified and labeled as Master-to-Slave slots or Slave-to-Master slots, in a manner similar to that of FIG. 4. The master starts broadcasting the first 5-slot packet 504a at slot0 and ends the broadcast at slot4, in a manner similarly as discussed above in the aspect of FIG. 4. However, the following slot is slot5 which is a slave-to-master slot, and since the 5-slot packet interval 508 is equivalent to the packet length, a gap or unused slot is not present between the end of the broadcast of the first packet and the start of the broadcasting of the second packet. As such, this results in the start of the broadcast of the second packet 504b to be scheduled on a slave-to-master slot. The slave-to-master slot may be utilized by the master to broadcast the second packet 504b. Thus, the master, in CSB burst mode, may be configured to broadcast packets on slave-to-master slots.

In instances where a packet 504 may be scheduled to start broadcasting on a slave-to-master slot (or an odd numbered slot), a hop frequency for such packet may need to be calculated based on a clock (CLK) value corresponding to the master-to-slave slot that precedes the slave-to-master slot in which the broadcast of such packet 504 is scheduled to start on. For example, in the aspect of FIG. 5, the second packet 504b may be scheduled to start broadcasting on slot5 (e.g., a slave-to-master slot). The hop frequency for that packet may be calculated by masking CLK[1] to zero. The hop frequency may be calculated by utilizing the clock value corresponding to the master-to-slave slot that precedes slot5, e.g., slot4. The clock value of the slot4 is 8, and the clock value of slot5 may be adjusted to that of slot4, such that the clock value of slot4 is used in the place of the clock value of slot5. Adjusting the clock value of slot5 to that of slot4 results in masking the clock value of slot5 to that of a master-to-slave slot (e.g., slot4). This allows the master to broadcast the second packet 504*b* at slot5 (e.g., a slave-to-master slot) with a hop frequency based on the clock value of slot4 (e.g., a master-to-slave slot), such that the master may be configured to broadcast packets on slave-to-master slots. The hop frequency calculations for all other packets is unchanged. For example, the third packet 504*c* is scheduled to broadcast on a master-to-slave slot and its hop frequency may be calculated in the conventional manner and does not need a hop frequency calculated as discussed for the second packet 504*b*. The fourth packet 504*d*, in the aspect of FIG. 5, is scheduled to broadcast on slot15, which is a slave-to-master slot, and the hop frequency may be determined by utilizing the clock value of the preceding master-to-slave slot, e.g., slot14, which is 28. Thus, by adjusting the clock value of slot15 with that of slot14, the master may broadcast the fourth packet 504*d* on a slave-to-master slot (e.g., slot 15). In the aspect of FIG. 5, the start times of packets (e.g., 504*a-e*) may be determined in reference to the beginning of the CSB interval 502, such that the hop frequency for packets scheduled to occur on slave-to-master slots may be adjusted to allow the master to broadcast on slave-to-master slots by adjusting the clock value. The adjusted clock value may be in reference to the start of the CSB interval. In the aspect of FIG. 5, the first CSB interval starts at clock 0.

In the aspect of FIG. 5, the hop frequencies of the packets 504 in the first CSB interval 502 may be calculated as follows (assuming that the first CSB instant 510 corresponds to slot number 0 and CLK is equal to 0):

Packet 1 (starts on slot 0, CLK=0)=hop(CLK=0)
Packet 2 (starts on slot 5, CLK=10)=hop(CLK=8)
Packet 3 (starts on slot 10, CLK=20)=hop(CLK=20)
Packet 4 (starts on slot 15, CLK=30)=hop(CLK=28)
Packet 5 (starts on slot 20, CLK=40)=hop(CLK=40)

In the aspect of FIG. 5, some of the packets 504 may start broadcasting on a master-to-slave slot (e.g., packets 504*a*, 504*c*, 504*e*), while some of the packets 504 may start broadcasting on a slave-to-master slot (e.g., packets 504*b* and 504*d*). In the example of FIG. 5, the hop frequency for packets 504*a*, 504*c*, and 504*e* may be calculated in the conventional manner, while the hop frequency for packets 504*b* and 504*d* would need to be calculated by masking the clock, as discussed above. The hop frequency calculated by masking the clock allows the master to broadcast packets using the slave-to-master slot, such that the master device may no longer be constrained to only being able to broadcast packets on master-to-slave slots. At least one advantage of the disclosure is that packets may be broadcast on slave-to-master slots which provides flexibility in packing the data together.

The example of FIG. 5 includes 5-slot packets each having 5-slot packet intervals. However, the disclosure is not intended to be limited to the aspect of FIG. 5. In some aspects, a 1-slot or a 3-slot packet may be used with a 1-slot or a 3-slot packet interval, respectively. In such instances, broadcasting of the next packet begins in the next immediate slot in which the previous packet ends. The slave-to-master slot following every other packet is thus used by the master to transmit a packet. A hop frequency would need to be calculated accordingly, in a manner similarly discussed above. In addition, the example of FIG. 5 shows the frequency of packets 504*a*-504*e* as being at one end of a spectrum, but the disclosure is not intended to be limited to such example. In some aspects, the frequency of packets 504*a*-504*e* may be any within the broadcast frequency spectrum and is not required to be at the end of the spectrum. The frequency and time chart of FIG. 5 is an example and the disclosure is not intended to be limited to such example.

Figure 6:
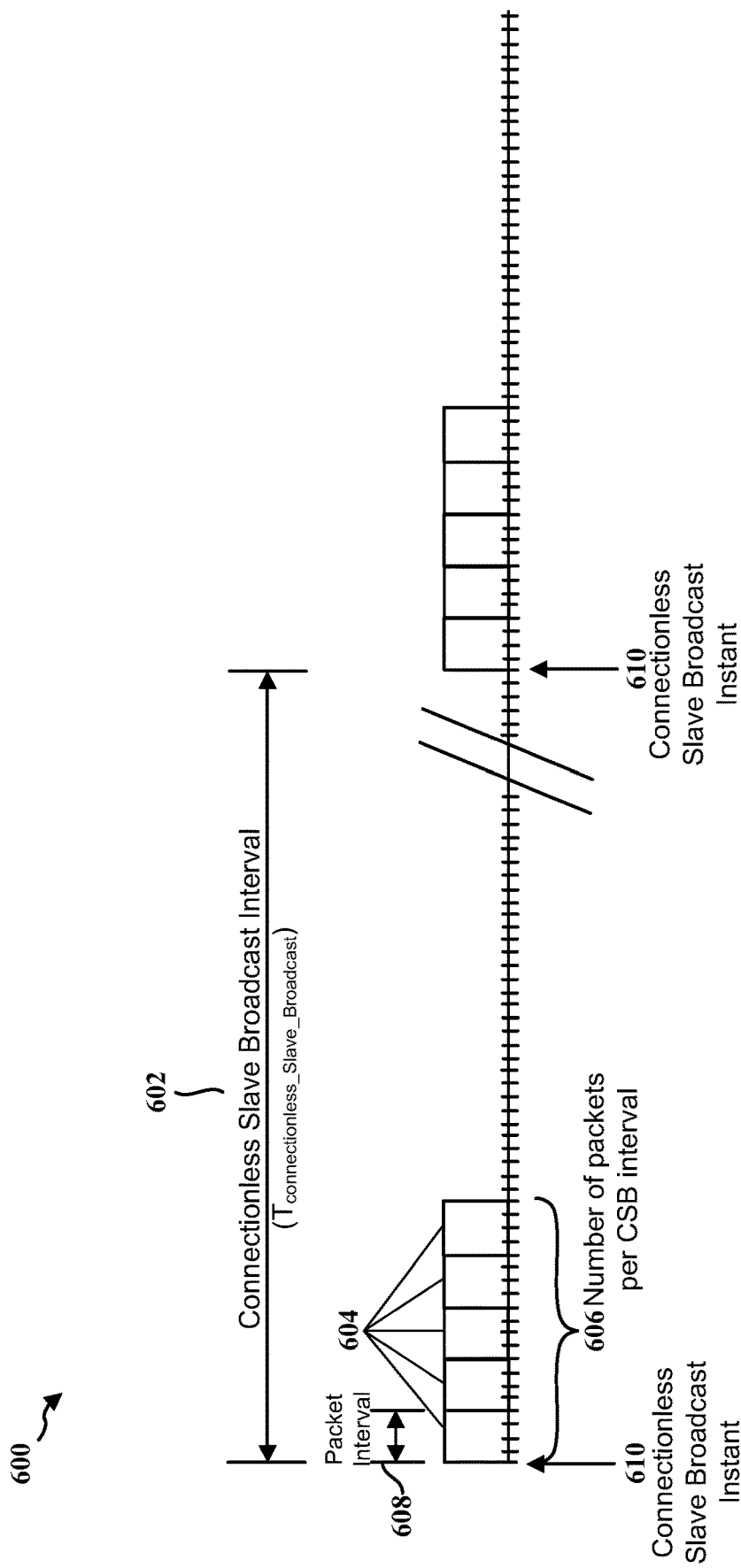
FIG. 6 is a diagram illustrating an air interface packet that may be generated in accordance with certain aspects of the disclosure.

FIG. 6 is a diagram illustrating an example 600 of a CSB burst mode in accordance with certain aspects of the disclosure. The example 600 of FIG. 6 also has some similarities to examples 400 and 500 in that the CSB burst mode may allow a master device to broadcast more than one packet 604 per CSB interval 602. The example 600 of FIG. 6 also includes a CSB interval 602, one or more packets 604, a set or number of packets 606 broadcasted during the CSB interval 602, a packet interval 608, and a CSB instant 610. However, in the aspect of FIG. 6, each packet 604 is a 5-slot packet 604 having a 4-slot packet interval 608.

In the example 600 of FIG. 6, the packet broadcast ends 1-slot early due to the packet interval 608 being 1-slot less than the packet length. As such, the next packet begins on the next immediate slot (e.g., a master-to-slave slot). Since the interval 608 is set at 4-slots, the subsequent packets will be scheduled to be broadcasted on an even number slot or a master-to-slave slot. At least one advantage is that in the aspect of FIG. 6, is that although the packet interval is less than the packet length, the reduced packet interval allows packets to be scheduled to be broadcast on master-to-slave slots. In addition, the CSB burst mode allows for an increase in efficiency despite the packet interval being less than the packet length. In the aspect of FIG. 6, the data within the packet 604 may be reduced to fit within the packet interval 608. For example, the data that may be within the 5$^{th}$ slot of the first packet 604 may be sent in the next packet, a future packet within the same interval 602, or a future packet in a different interval 602. This aspect may limit the amount of data in the packets 604, because the interval cuts short the broadcast of the packets 604, as shown in Table 1-1 below. Although the aspect of FIG. 6 may limit the amount of data that may be sent in individual packets 604, the master in the aspect of FIG. 6 may still broadcast more than one packet in the CSB interval due to the CSB burst mode, and have an improved latency in comparison to conventional CSB mode.

TABLE 1-1

3 or 5 slot packets used with 2 or 4 slot intervals

| Packet type | Packet interval (slots) | User payload (bytes) | Time until next slot (us; max length packet) |
| --- | --- | --- | --- |
| 2-DH3 | 2 | 0-220 | 233 |
| 2-DH5 | 4 | 0-533 | 231 |

Table 1-1 provides user payload in bytes and time until the next slot for a 2-slot and a 4-slot packet interval when used with a 3-slot or 5-slot package, respectively. As seen in Table 1-1, the amount of data available in instances where the packet interval 608 is less than the packet length limits the amount of data in the packet 604. Although the aspect of FIG. 6 may limit the amount of data in the packets, the aspect of FIG. 6 provides the advantage of broadcasting more than one packet during the CSB interval.

Figure 7:
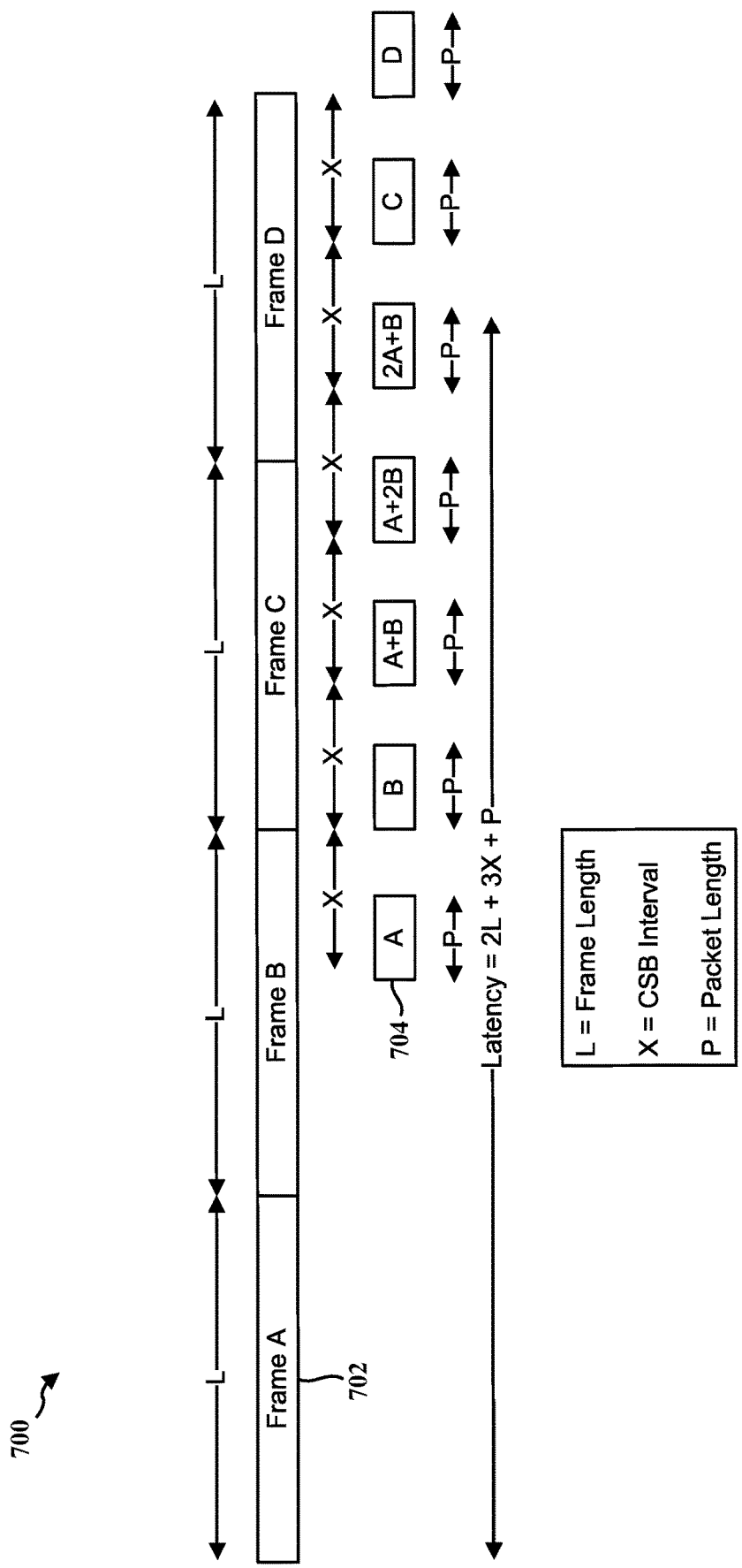
FIG. 7 is a diagram illustrating a latency calculation for the air interface packet in accordance with certain aspects of the disclosure.

FIG. 7 is a diagram illustrating a latency calculation for the air interface packet in accordance with certain aspects of the disclosure. CSB burst mode may be used to improve the latency and duty cycle of data transmissions, due in part to efficiently utilizing the time slots of a CSB interval while in CSB burst mode. FIG. 7 provides an example of a latency calculation 700 for legacy CSB which may use an N:M erasure code, where N encoded frames 702 are mixed to create a total of M packets 704 which get transmitted over the air. Legacy CSB may also utilize CSB mode as defined in the Bluetooth Core Specification Volume 2, Part B, Section 8.10.

FIG. 7 shows an example of a latency calculations 700 for legacy CSB using a 2:5 erasure coding, where L refers to the length of a frame 702, X refers to the CSB interval (which in some aspects may be fixed at 22 slots or 13.75 ms), and P refers to the length of a packet 704 (which in some aspects may be fixed at 2-DH5 e.g., 5 slots or 3.125 ms).

Latency for legacy CSB using N:M erasure coding may be defined by the equation:

$$N*L+(M-N)*X+P$$

Which may be simplified to:

$$(2-N/M)*N*L+P$$

Table 1-2, below, shows the latency, duty cycle, max contiguous time for other radio activities numbers for legacy CSB

TABLE 1-2

Broadcast Audio 1.0 latency

| Erasure coding | Frame length (ms) | Latency (ms) | Duty cycle (%) | time for other radio activities (ms) |
|---|---|---|---|---|
| 2:5 | 34.375 | 113.125 | 22.72 | 10.625 |
| 3:9 | 41.25 | 209.375 | 22.72 | 10.625 |

Figure 8:
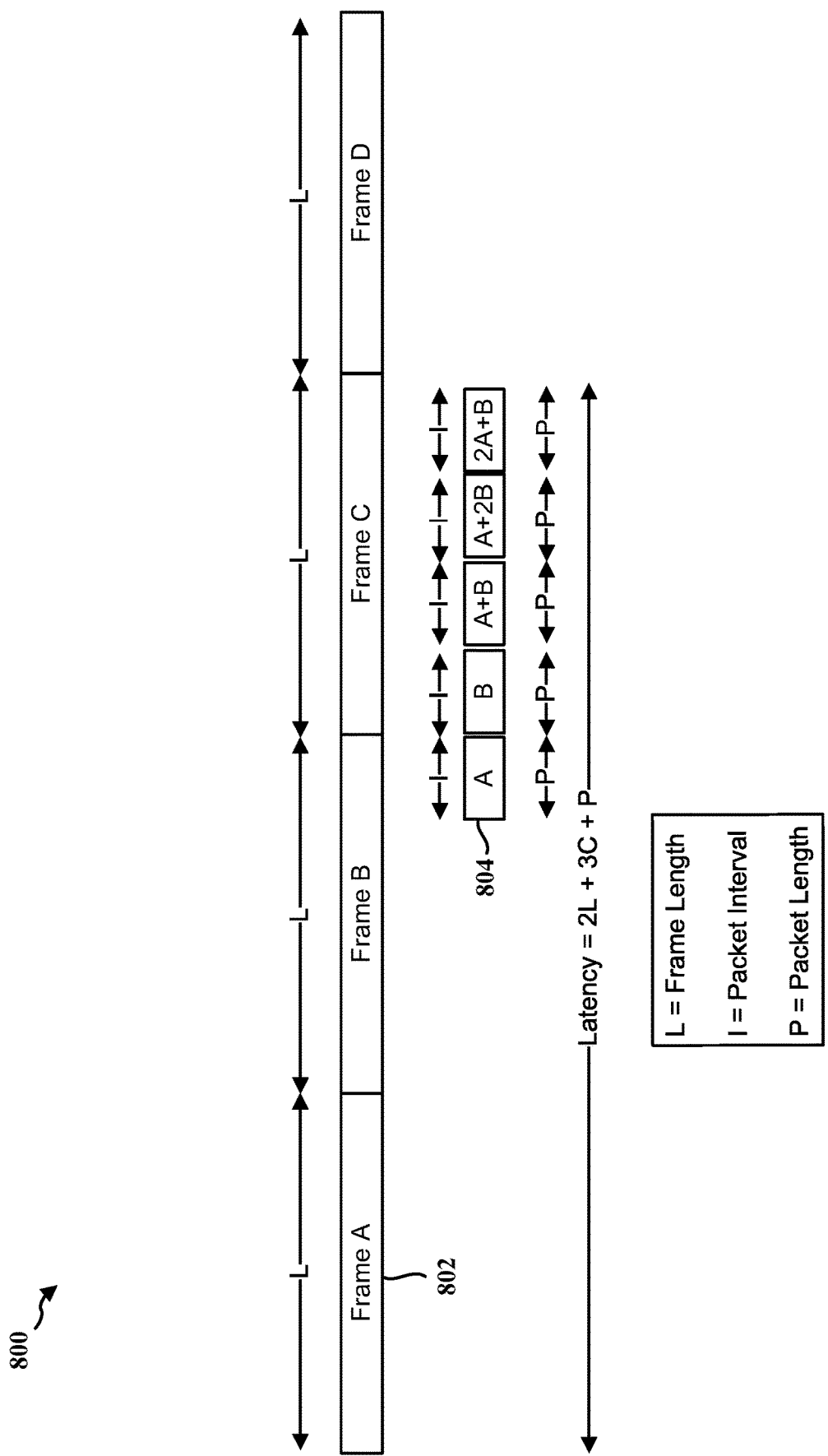
FIG. 8 is a diagram illustrating a latency calculation for the air interface packet in accordance with certain aspects of the disclosure.

FIG. 8 is a diagram illustrating a latency calculation 800 for the air interface packet in accordance with certain aspects of the disclosure. FIG. 8 provides an example of a latency calculation 800 for legacy CSB using CSB burst mode and a 2:5 erasure coding, where N (or 2) encoded frames 802 are mixed to create a total of M (or 5) packets 804 which get transmitted over the air. In the latency calculation 800 of FIG. 8, L refers to the length of the frame 802, P refers to the length of the packet 804, and I refers to the packet interval. As shown in FIG. 8, packets A & B are sent multiple times, and may be combined with each other to form the M (or 5) packets. Erasure coding may improve latency in combination with CSB burst mode.

Latency using CSB burst mode with N:M erasure coding may be defined by the equation:

$$N*L+(M-N)*I+P$$

Table 1-3, below, shows various configurations of packet types, packet intervals, CSB intervals, and frame lengths that may be used to achieve improved latency using CSB Burst Mode. The duty cycle and max contiguous time for other radio activities numbers are also shown.

TABLE 1-3

Broadcast Audio using CSB burst mode latency

| Erasure coding | Packet type | Packet interval (slots) | CSB interval (ms) | Frame length (ms) | Latency (ms) | Duty Cycle (%) | time for other radio activities (ms) |
|---|---|---|---|---|---|---|---|
| 2:5 | 2-DH5 | 6 | 68.75 | 34.375 | 83.125 | 26.36 | 50.625 |
| 2:5 | 2-DH5 | 5 | 68.75 | 34.375 | 81.25 | 22.72 | 53.125 |
| 2:5 | 2-DH5 | 4 | 53.75 | 26.875 | 63.75 | 23.25 | 41.25 |
| 2:5 | 2-DH3 | 4 | 37.5 | 18.75 | 46.875 | 31.67 | 25.625 |
| 2:5 | 2-DH3 | 3 | 37.5 | 18.75 | 45 | 25 | 28.125 |
| 2:5 | 2-DH3 | 2 | 22.5 | 11.25 | 27.5 | 27.77 | 16.25 |
| 3:9 | 2-DH5 | 6 | 123.75 | 41.25 | 149.375 | 26.77 | 90.625 |
| 3:9 | 2-DH5 | 5 | 123.75 | 41.25 | 145.625 | 22.72 | 95.625 |
| 3:9 | 2-DH5 | 4 | 97.5 | 32.5 | 115 | 23.07 | 75 |
| 3:9 | 2-DH3 | 4 | 66.25 | 22.08 | 83.125 | 33 | 44.375 |
| 3:9 | 2-DH3 | 3 | 66.25 | 22.08 | 79.375 | 25.47 | 49.375 |
| 3:9 | 2-DH3 | 2 | 40 | 13.33 | 48.75 | 28.125 | 28.75 |

In using 2:5 erasure coding, latency improved as the CSB interval and frame length decreased. Table 1-3 also shows results utilizing 3:9 erasure coding, which also showed improved latency as the CSB interval and frame length decreased. Comparing the results of Table 1-2 and Table 1-3, it is clear that the latency is considerably improved under the CSB burst mode. For example, the latency using legacy CSB mode with 2:5 erasure coding was 113.125 ms, while the latency using CSB burst mode with 2:5 erasure coding was 83.125 ms. Thus, under the same conditions, the latency improved under the CSB burst mode. Such an improvement may enhance the robustness of the data transmission.

Bluetooth Core 5.0 Specification (Volume 2, Part B, Section 8.11.2) requires the use of DM3 packets for the synchronization train packets and requires all devices in the synchronization scan substrate to ignore bytes 28 onwards (counting from 0) and beyond. Upon receiving a synchronization train packet, devices may be configured to check if Bytes 28 and 29 contain a company ID (0x000A or 0x001D), and if bytes 30 and 31 contain the 16-bit UUID 0xFE8F. If matched, the format defined by Octet 32 shall be used to interpret the remaining part of the synchronization train packet. Currently, only one format is defined which is described in Table 1-4, below.

TABLE 1-4

Synchronization train packet format byte 28 and beyond

| Bytes | Field | Length | Format 1 Description |
|---|---|---|---|
| 28-29 | Company ID | 2 Bytes | 0x000A or 0x001D |
| 30-31 | 16-bit UUID | 2 Bytes | 0xFE8F |
| 32 | Format | 1 Byte | 0x00 |
| 33-34 | Broadcast Version | 2 Bytes | |
| 35-36 | Broadcast Status | 2 Bytes | |
| 37 | Broadcast Key ID | 1 Byte | |
| 38-53 | Broadcast Security Key | 16 Bytes | |
| 54-55 | Broadcast DIV | 2 Bytes | |
| 56 | Number of Streams | 1 Byte | |
| 57 | Stream ID 0 | 1 Byte | |
| 58 | Stream ID 0 total property length | 1 Byte | |
| 59- | Stream ID 0 property tags 0 to N | Variable | |

TABLE 1-4-continued

Synchronization train packet format byte 28 and beyond

| Bytes | Field | Length | Format 1 Description |
|---|---|---|---|
| X | Stream ID 1 | 1 Byte | |
| X + 1 | Stream ID 1 total property length | 1 Byte | |
| X + 2 | Stream ID 1 property tags 0 to M | Variable | |
| ... | | | |
| Y | Broadcast Identifier Length | 1 Byte | |
| Y + 1 | Broadcast Identifier | Variable | |
| Y + 2 | Broadcast Burst Mode | 1 Byte | |

Broadcast Version, Broadcast Status, Broadcast Security Key, Stream IDs, property tags, Broadcast Identifier may be utilized to provide information related to the synchronization train and/or CSB burst mode operation. Broadcast Key ID equal to 0x00 means that the Broadcast Security Key and Broadcast DIV are not present in the synchronization train packet. Otherwise, both the Broadcast Security Key and Broadcast DIV shall be present.

Table 1-5, below, describes features of Broadcast Burst Mode.

TABLE 1-5

Broadcast Burst Mode

| RFU (4 bits) | Packet interval (3 bits) | CSB Burst Mode (1 bit) |
|---|---|---|
| Reserved for future use | Packet interval in slots | 0 = CSB Burst mode disabled<br>1 = CSB Burst mode enabled |

Figure 9:
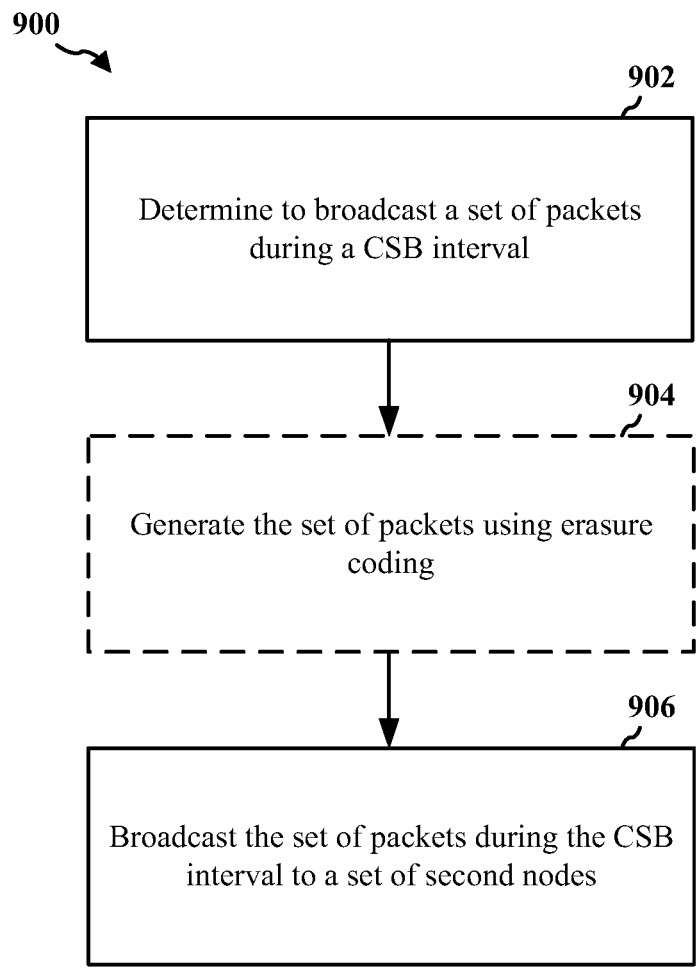
FIG. 9 is a flowchart of a method of wireless communication.

FIG. 9 is a flowchart of a method of wireless communication in accordance with certain aspects of the disclosure.

FIG. 9 is a flowchart 900 of a method of wireless communication. The method may be performed by a first device (e.g., the wireless device 102, peripheral device 104, 106, 108, 110, 112, 114, wireless device 200, the apparatus 1002/1002', or the mesh node 1050.

Referring to FIG. 9, at 902, the first device or master device (e.g., the wireless device 102, peripheral device 104, 106, 108, 110, 112, 114, wireless device 200, the apparatus 1002/1002', or the mesh node 1050) may determine to broadcast a set of packets (e.g., 406, 506, 606) during a CSB interval (e.g., 402, 502, 602). In some aspects, the set of packets may include a plurality of packets (e.g., 404, 504, 604). For example, the plurality of packets may be broadcasted using CSB burst mode as shown in the aspects of FIGS. 4-6.

At 904, the first device may generate the set of packets using erasure coding. For example, referring to FIG. 8, the first device may be configured to broadcast packets (e.g., packets 804) multiple times in order to improve latency. In some aspects, the first device may use an N:M erasure coding where N encoded frames are mixed to create a total of M packets. In some examples, a first packet of the set of broadcasted packets and at least one second packet of the set of broadcasted packets may be associated with a same set of data. In some examples, the first packet of the set of broadcasted packets may be associated with a first set of data, the second packet of the set of broadcast packets may be associated with a second set of data, a third packet of the set of broadcast packets may be associated with a combination of the first set of data and the second set of data, a fourth packet of the set of broadcast packets may be associated with a combination of the first set of data and twice the second set of data, and a fifth packet of the set of broadcast packets may be associated with a combination of twice the first set of data and the second set of data.

Finally, at 906, the first device may broadcast the set of packets during the CSB interval (e.g., 402, 502, 602), as shown in FIGS. 4-6, to a set of second devices (e.g., zero or more slave devices). In some aspects, the second device may be the wireless device 102, peripheral device 104, 106, 108, 110, 112, 114, wireless device 200, the apparatus 1002/1002', or the mesh node 1050. In some examples, the first device may be a master node, and each second node of a set of second nodes may be a slave node. For example, a start of the broadcast of each packet of the set of packets is in a master-to-slave slot within a CSB interval. In such examples, each packet is broadcasted over an odd number of slots within a packet interval that extends an even number of slots, such that a slot following each broadcast of each packet may be a slave-to-master slot that is unused by the first device. In some examples, each packet has a packet type associated with an odd number of slots and may be broadcasted over an even number of slots less than the odd number of slots within a packet interval that extends a same number of even slots. In some examples, the start of the broadcast of a first subset of the packets of the set of packets is a master-to-slave slot within the CSB interval, and the start of the broadcast of a second subset of the packets of the set of packets is a slave-to-master slot within the CSB interval. In such example, a hopping frequency of each packet in the first subset of the packets may be based on a clock (CLK) value corresponding to the master-to-slave slot in which the broadcast of the packet is started, and a hopping frequency of each packet in the second subset of the packets may be based on a CLK value corresponding to the master-to-slave slot that precedes the slave-to-master slot in which the broadcast of the packet is started.

In some examples, the first device may broadcast the set of packets with each packet having a packet length and is broadcasted at the same packet interval. For example, referring to FIG. 4, the first device may broadcast the set of packets where each packet may be a 5-slot packet and broadcasted at a 6-slot interval. In other examples, such as FIG. 5, the first device may broadcast the set of packets where each packet may be a 5-slot packet and broadcasted at a 5-slot interval. In yet other examples, such as FIG. 6, the first device may broadcast the set of packets where each packet may be a 5-slot packet and broadcasted at a 4-slot interval.

Figure 10:
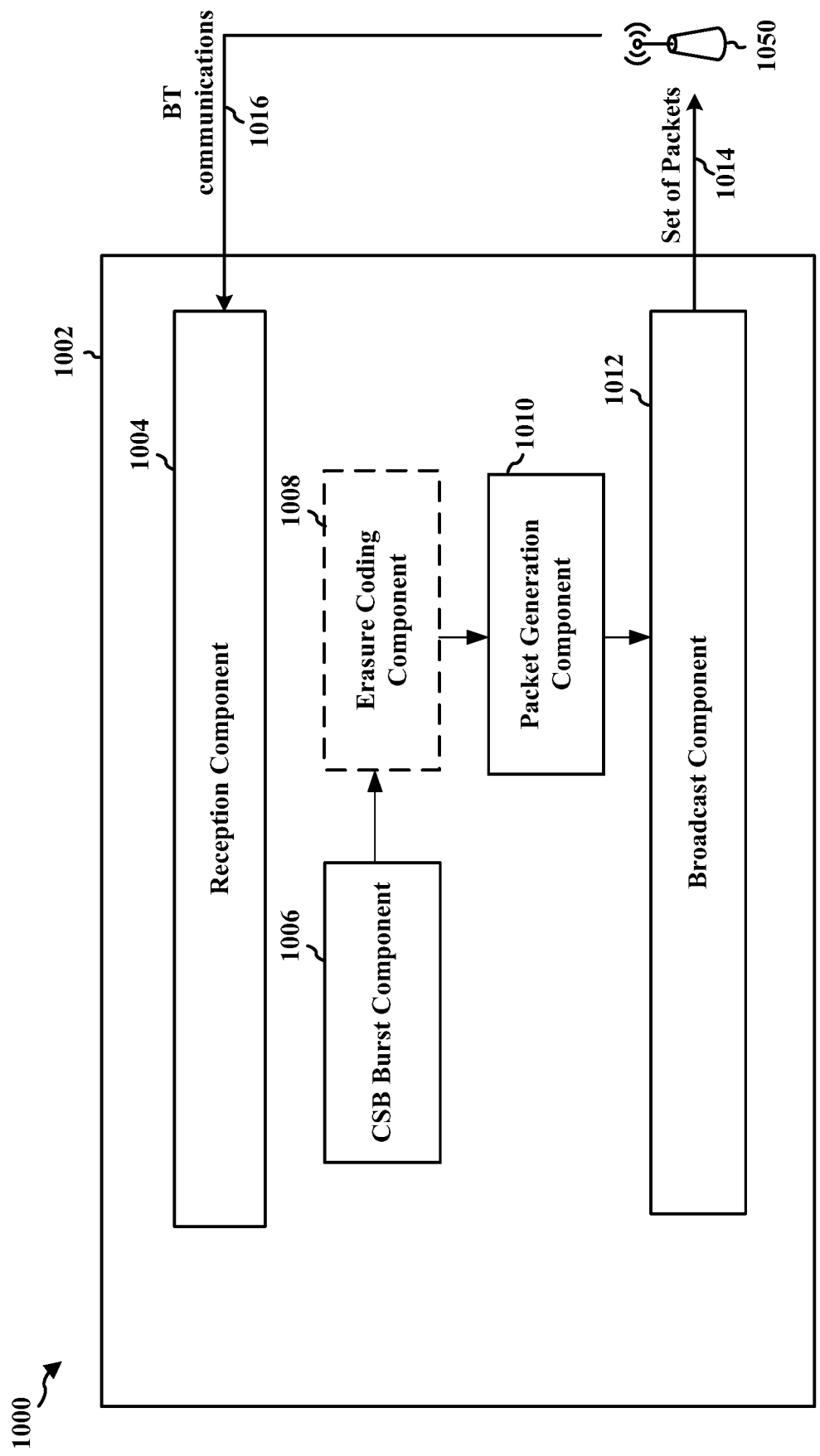
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a first or master device (e.g., the wireless device 102, peripheral device 104, 106, 108, 110, 112, 114, wireless device 200 in communication with a second device (e.g., wireless device 102, peripheral device 104, 106, 108, 110, 112, 114, wireless device 200, or the mesh node 1050). The apparatus includes a reception component 1004 configured to receive BT communications 1016, a CSB burst component 1006, an erasure coding component 1008, a packet generation component 1010, and a broadcast component 1012 configured to broadcast a set of packet 1014 to the second device.

The CSB burst component 1006 may be configured to prepare a set of packets (e.g., 406, 506, 606) for broadcast during a CSB interval (e.g., 402, 502, 602). For example, the CSB burst component may prepare a plurality of packets for broadcast during the CSB interval. For example, the plurality of packets may be arranged to be broadcasted using CSB burst mode as shown in the aspects of FIGS. 4-6.

The erasure coding component 1008 may be configured to generate the set of packets using erasure coding. For example, referring to FIG. 8, the erasure coding component may be configured to arrange the packets 804 to be broadcasted multiple times in order to improve latency. In some aspects, the erasure coding component may use an N:M erasure coding where N encoded frames are mixed to create a total of M packets. In some examples, a first packet of the set of broadcasted packets and at least one second packet of the set of broadcasted packets may be associated with a same set of data. In some examples, the first packet of the set of broadcasted packets may be associated with a first set of data, the second packet of the set of broadcast packets may be associated with a second set of data, a third packet of the set of broadcast packets may be associated with a combination of the first set of data and the second set of data, a fourth packet of the set of broadcast packets may be associated with a combination of the first set of data and twice the second set of data, and a fifth packet of the set of broadcast packets may be associated with a combination of twice the first set of data and the second set of data. The packet generation component 1010 may be configured to receive the data from either the CSB burst component 1006 or the erasure coding component 1008 and prepare the packets for broadcast. The packet generation component 1010 then sends the generated packets to the broadcast component 1012.

The broadcast component 1012 may be configured to broadcast the set of packets (e.g., packets 404, 504, 604) received from the packet generation component 1010 during the CSB interval (e.g., CSB interval 402, 502, 602) to a set of second nodes (e.g., zero or more slave devices), as discussed in reference to FIGS. 4-6. For example, the broadcast component may be configured to start the broadcast of each packet of the set of packets in a master-to-slave slot within a CSB interval (e.g., CSB interval 402, 502, 602). In some examples, each packet is broadcasted by the broadcast component over an odd number of slots within a packet interval that extends an even number of slots, such that a slot following each broadcast of each packet may be a slave-to-master slot that is unused by the first device. In some examples, each packet has a packet type associated with an odd number of slots and may be broadcasted over an even number of slots less than the odd number of slots within a packet interval that extends a same number of even slots. In some examples, the broadcast component may be configured to start the broadcast of a first subset of the packets of the set of packets in a master-to-slave slot within the CSB interval, and start the broadcast of a second subset of the packets of the set of packets in a slave-to-master slot within the CSB interval. In some examples, a hopping frequency for each packet in the first subset of the packets may be based on a clock (CLK) value corresponding to the master-to-slave slot in which the broadcast of the packet is started, and a hopping frequency of each packet in the second subset of the packets may be based on a CLK value corresponding to the master-to-slave slot that precedes the slave-to-master slot in which the broadcast of the packet is started, as discussed, for example, in reference to FIG. 5.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
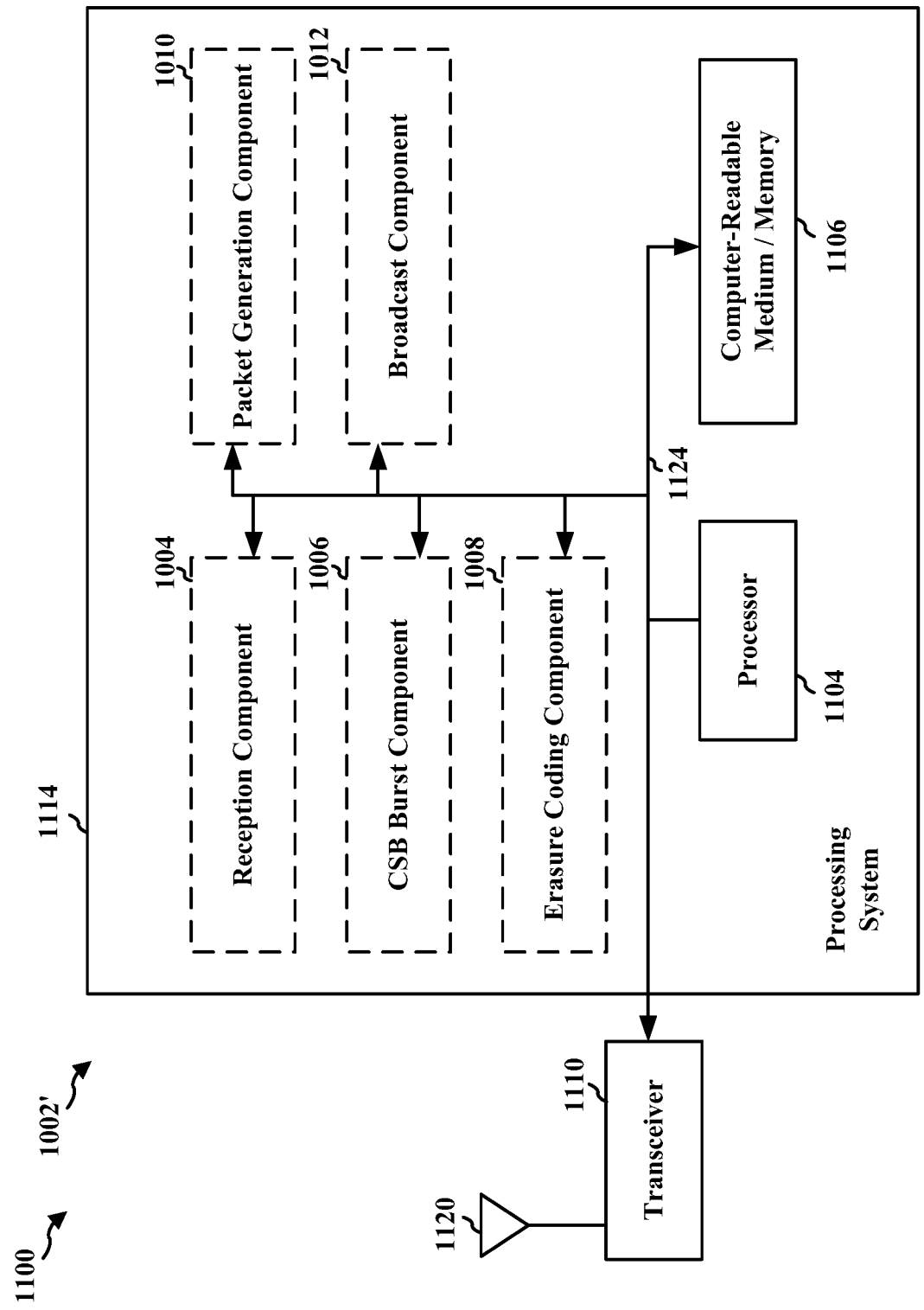
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, and 1012 the computer-readable medium/memory 1106. The bus 1124 may also link various other circuits such as timing sources, peripherals, voltage regulators, and power management circuits, which are well known in the art, and therefore, may not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the broadcast component 1012, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, and 1012. The components may be software components running in the processor 1104, resident/stored in the computer readable medium/memory 1106, one or more hardware components coupled to the processor 1104, or some combination thereof.

In certain configurations, the apparatus 1002/1002' for wireless communication may include means for determining to broadcast a set of packets during a CSB interval. The set of packets may include a plurality of packets. The apparatus may include means for broadcasting the set of packets during the CSB interval to a set of second nodes. The apparatus may further include means for generating the set of packets using erasure coding. The aforementioned means may be the processor(s) 202, the radio 230, the MMU 240, the WLAN controller 250/short-range communication controller 252, one or more of the aforementioned components of the apparatus 1002 and/or the processing system 1114 of the apparatus 1002' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first node, comprising:
    determining to broadcast a set of packets during a connectionless slave broadcast (CSB) interval, the set of packets including a plurality of packets; and
    broadcasting the set of packets during the CSB interval to a set of second nodes,
    wherein a start of the broadcast of the set of packets is in a respective master-to-slave slot within the CSB interval, and wherein each packet of the set of packets is broadcast within a respective packet interval of a plurality of consecutive packet intervals within the CSB interval, each of the plurality of consecutive packet intervals comprising a plurality of slots of the CSB interval, wherein each packet is broadcasted over an odd number of consecutive slots within a packet interval of the plurality of consecutive packet intervals that extends an even number of slots.

2. The method of claim 1, wherein a start of the broadcast of each packet of the set of packets is in a master-to-slave slot within the CSB interval.

3. The method of claim 2, wherein a slot following each broadcast of each packet being a slave-to-master slot that is unused by the first node.

4. The method of claim 2, wherein each packet has a packet type associated with the odd number of slots and is broadcasted over the even number of slots less than the odd number of slots within a packet interval of the plurality of consecutive packet intervals that extends a same number of even slots.

5. The method of claim 1, wherein a start of the broadcast of a first subset of packets of the set of packets is a master-to-slave slot within the CSB interval, and a start of the broadcast of a second subset of packets of the set of packets is a slave-to-master slot within the CSB interval.

6. The method of claim 5, wherein a hopping frequency of each packet in the first subset of packets is based on a clock (CLK) value corresponding to the master-to-slave slot in which the broadcast of the packet is started, and a hopping frequency of each packet in the second subset of packets is based on a CLK value corresponding to the master-to-slave slot that precedes the slave-to-master slot in which the broadcast of the packet is started.

7. The method of claim 1, further comprising generating the set of packets using erasure coding.

8. The method of claim 7, wherein a first packet of the set of packets and at least one second packet of the set of packets being associated with a same set of data.

9. The method of claim 8, wherein a first packet of the set of packets being associated with a first set of data, a second packet of the set of packets being associated with a second set of data, a third packet of the set of packets being associated with a combination of the first set of data and the second set of data, a fourth packet of the set of packets being associated with a combination of the first set of data and twice the second set of data, and a fifth packet of the set of packets being associated with a combination of twice the first set of data and the second set of data.

10. The method of claim 1, wherein each packet in the set of packets is a packet type that includes one of a basic rate packet type, an enhanced data rate (EDR) packet type, a Bluetooth Low Energy packet type, or a proprietary packet type.

11. The method of claim 1, wherein the first node is a master node, and each second node of the set of second nodes is a slave node.

12. An apparatus for wireless communication of a first node, comprising:
    a memory; and
    at least one processor communicatively coupled to the memory and configured to:
        determine to broadcast a set of packets during a connectionless slave broadcast (CSB) interval, the set of packets including a plurality of packets; and
        broadcast the set of packets during the CSB interval to a set of second nodes, wherein a start of the broadcast of the set of packets is in a respective master-to-slave slot within the CSB interval, and wherein each packet of the set of packets is broadcast within a respective packet interval of a plurality of consecutive packet intervals within the CSB interval, each of the plurality of consecutive packet intervals comprising a plurality of slots of the CSB interval, wherein each packet is broadcasted over an odd number of consecutive slots within a packet interval of the plurality of consecutive packet intervals that extends an even number of slots.

13. The apparatus of claim 12, wherein a start of the broadcast of each packet of the set of packets is in a master-to-slave slot within the CSB interval.

14. The apparatus of claim 13, wherein a slot following each broadcast of each packet being a slave-to-master slot that is unused by the first node.

15. The apparatus of claim 13, wherein each packet has a packet type associated with the odd number of slots and is broadcasted over the even number of slots less than the odd number of slots within a packet interval of the plurality of consecutive packet intervals that extends a same number of even slots.

16. The apparatus of claim 12, wherein a start of the broadcast of a first subset of packets of the set of packets is a master-to-slave slot within the CSB interval, and a start of the broadcast of a second subset of packets of the set of packets is a slave-to-master slot within the CSB interval.

17. The apparatus of claim 16, wherein a hopping frequency of each packet in the first subset of packets is based on a clock (CLK) value corresponding to the master-to-slave slot in which the broadcast of the packet is started, and a hopping frequency of each packet in the second subset of packets is based on a CLK value corresponding to the master-to-slave slot that precedes the slave-to-master slot in which the broadcast of the packet is started.

18. The apparatus of claim 12, wherein the at least one processor is further configured to:
generate the set of packets using erasure coding.

19. The apparatus of claim 18, wherein a first packet of the set of packets and at least one second packet of the set of packets being associated with a same set of data.

20. The apparatus of claim 19, wherein a first packet of the set of packets being associated with a first set of data, a second packet of the set of packets being associated with a second set of data, a third packet of the set of packets being associated with a combination of the first set of data and the second set of data, a fourth packet of the set of packets being associated with a combination of the first set of data and twice the second set of data, and a fifth packet of the set of packets being associated with a combination of twice the first set of data and the second set of data.

21. The apparatus of claim 12, wherein each packet in the set of packets is a packet type that includes one of a basic rate packet type, an enhanced data rate (EDR) packet type, a Bluetooth Low Energy packet type, or a proprietary packet type.

22. The apparatus of claim 12, wherein the first node is a master node, and each second node of the set of second nodes is a slave node.

23. An apparatus for wireless communication of a first node, comprising:
means for determining to broadcast a set of packets during a connectionless slave broadcast (CSB) interval, the set of packets including a plurality of packets; and
means for broadcasting the set of packets during the CSB interval to a set of second nodes, wherein a start of the broadcast of the set of packets is in a respective master-to-slave slot within the CSB interval, and wherein each packet of the set of packets is broadcast within a respective packet interval of a plurality of consecutive packet intervals within the CSB interval, each of the plurality of consecutive packet intervals comprising a plurality of slots of the CSB interval, wherein each packet is broadcasted over an odd number of consecutive slots within a packet interval of the plurality of consecutive packet intervals that extends an even number of slots.

24. The apparatus of claim 23, wherein a start of the broadcast of each packet of the set of packets is in a master-to-slave slot within the CSB interval.

25. The apparatus of claim 24, wherein a slot following each broadcast of each packet being a slave-to-master slot that is unused by the first node.

26. The apparatus of claim 24, wherein each packet has a packet type associated with the odd number of slots and is broadcasted over the even number of slots less than the odd number of slots within a packet interval of the plurality of consecutive packet intervals that extends a same number of even slots.

27. The apparatus of claim 23, wherein a start of the broadcast of a first subset of packets of the set of packets is a master-to-slave slot within the CSB interval, and a start of the broadcast of a second subset of packets of the set of packets is a slave-to-master slot within the CSB interval.

28. The apparatus of claim 27, wherein a hopping frequency of each packet in the first subset of packets is based on a clock (CLK) value corresponding to the master-to-slave slot in which the broadcast of the packet is started, and a hopping frequency of each packet in the second subset of packets is based on a CLK value corresponding to the master-to-slave slot that precedes the slave-to-master slot in which the broadcast of the packet is started.

29. The apparatus of claim 23, further comprising means for generating the set of packets using erasure coding.

30. The apparatus of claim 29, wherein a first packet of the set of packets and at least one second packet of the set of packets being associated with a same set of data.

31. The apparatus of claim 30, wherein a first packet of the set of packets being associated with a first set of data, a second packet of the set of packets being associated with a second set of data, a third packet of the set of packets being associated with a combination of the first set of data and the second set of data, a fourth packet of the set of packets being associated with a combination of the first set of data and twice the second set of data, and a fifth packet of the set of packets being associated with a combination of twice the first set of data and the second set of data.

32. The apparatus of claim 23, wherein each packet in the set of packets is a packet type that includes one of a basic rate packet type, an enhanced data rate (EDR) packet type, a Bluetooth Low Energy packet type, or a proprietary packet type.

33. The apparatus of claim 23, wherein the first node is a master node, and each second node of the set of second nodes is a slave node.

34. A non-transitory computer-readable medium storing computer executable code for a first node, comprising code to:
determine to broadcast a set of packets during a connectionless slave broadcast (CSB) interval, the set of packets including a plurality of packets; and
broadcast the set of packets during the CSB interval to a set of second nodes, wherein a start of the broadcast of the set of packets is in a respective master-to-slave slot within the CSB interval, and wherein each packet of the set of packets is broadcast within a respective packet interval of a plurality of consecutive packet intervals within the CSB interval, each of the plurality of consecutive packet intervals comprising a plurality of slots of the CSB interval, wherein each packet is broadcasted over an odd number of consecutive slots within a packet interval of the plurality of consecutive packet intervals that extends an even number of slots.

35. The non-transitory computer-readable medium of claim 34, wherein a start of the broadcast of each packet of the set of packets is in a master-to-slave slot within the CSB interval.

36. The non-transitory computer-readable medium of claim 35, wherein a slot following each broadcast of each packet being a slave-to-master slot that is unused by the first node.

37. The non-transitory computer-readable medium of claim 35, wherein each packet has a packet type associated with the odd number of slots and is broadcasted over the even number of slots less than the odd number of slots within a packet interval of the plurality of consecutive packet intervals that extends a same number of even slots.

38. The non-transitory computer-readable medium of claim 34, wherein a start of the broadcast of a first subset of packets of the set of packets is a master-to-slave slot within the CSB interval, and a start of the broadcast of a second subset of packets of the set of packets is a slave-to-master slot within the CSB interval.

39. The non-transitory computer-readable medium of claim 38, wherein a hopping frequency of each packet in the first subset of packets is based on a clock (CLK) value corresponding to the master-to-slave slot in which the broadcast of the packet is started, and a hopping frequency of each packet in the second subset of packets is based on a CLK value corresponding to the master-to-slave slot that precedes the slave-to-master slot in which the broadcast of the packet is started.

40. The non-transitory computer-readable medium of claim 34, further comprising code to generate the set of packets using erasure coding.

41. The non-transitory computer-readable medium of claim 40, wherein a first packet of the set of packets and at least one second packet of the set of packets being associated with a same set of data.

42. The non-transitory computer-readable medium of claim 41, wherein a first packet of the set of packets being associated with a first set of data, a second packet of the set of packets being associated with a second set of data, a third packet of the set of packets being associated with a combination of the first set of data and the second set of data, a fourth packet of the set of packets being associated with a combination of the first set of data and twice the second set of data, and a fifth packet of the set of packets being associated with a combination of twice the first set of data and the second set of data.

43. The non-transitory computer-readable medium of claim 34, wherein each packet in the set of packets is a packet type that includes one of a basic rate packet type, an enhanced data rate (EDR) packet type, a Bluetooth Low Energy packet type, or a proprietary packet type.

44. The non-transitory computer-readable medium of claim 34, wherein the first node is a master node, and each second node of the set of second nodes is a slave node.

\* \* \* \* \*